United States Patent
Loughrey et al.

(10) Patent No.: US 10,838,746 B2
(45) Date of Patent: Nov. 17, 2020

(54) IDENTIFYING PARAMETER VALUES AND DETERMINING FEATURES FOR BOOSTING RANKINGS OF RELEVANT DISTRIBUTABLE DIGITAL ASSISTANT OPERATIONS

(71) Applicant: AIQUDO, INC., Campbell, CA (US)

(72) Inventors: Conal Loughrey, Portstewart (GB); Hudson Leonardo Mendes, Belfast (GB)

(73) Assignee: AIQUDO, INC., Campbell, CA (US)

( * ) Notice: Subject to any disclaimer, the term of this patent is extended or adjusted under 35 U.S.C. 154(b) by 0 days.

(21) Appl. No.: 16/521,504

(22) Filed: Jul. 24, 2019

(65) Prior Publication Data

US 2019/0347118 A1 Nov. 14, 2019

Related U.S. Application Data

(63) Continuation-in-part of application No. 16/047,782, filed on Jul. 27, 2018, now Pat. No. 10,698,654.
(Continued)

(51) Int. Cl.
*G06F 9/451* (2018.01)
*G06F 16/9032* (2019.01)

(52) U.S. Cl.
CPC ........ *G06F 9/453* (2018.02); *G06F 16/90332* (2019.01)

(58) Field of Classification Search
CPC .............. G06F 9/453; G06F 16/90332; G06F 9/45512; G06F 9/44505
See application file for complete search history.

(56) References Cited

U.S. PATENT DOCUMENTS 5,600,711 A 2/1997 Yuen
6,173,266 B1 1/2001 Marx et al.
(Continued)

FOREIGN PATENT DOCUMENTS

EP 2760015 A1 7/2014

OTHER PUBLICATIONS

First Action Interview Preinterview Communication dated Nov. 29, 2019 in U.S. Appl. No. 16/038,993, 6 pages.
(Continued)

*Primary Examiner* — Matthew Ell
(74) *Attorney, Agent, or Firm* — Shook, Hardy & Bacon L.L.P.

(57) ABSTRACT

Embodiments described herein are generally directed towards systems and methods relating to a crowd-sourced digital assistant system and related methods. In particular, embodiments describe techniques for effectively searching, modifying, identifying parameter values, and determining features for selecting action datasets for distribution to digital assistant devices based on commands received therefrom. Action datasets include computing events or tasks that can be reproduced when a command is received by a digital assistant device and communicated to the server device. The digital assistant server described herein can receive action datasets, maintain action datasets, receive commands from digital assistant devices, and effectively select most relevant action datasets for distribution to the digital assistant devices based on the received commands.

17 Claims, 6 Drawing Sheets

Related U.S. Application Data

(60) Provisional application No. 62/576,800, filed on Oct. 25, 2017, provisional application No. 62/580,444, filed on Nov. 1, 2017.

(56) References Cited

U.S. PATENT DOCUMENTS

| | | |
|---|---|---|
| 6,636,831 B1 | 10/2003 | Profit, Jr. et al. |
| 6,678,864 B1 | 1/2004 | Tsai |
| 7,024,348 B1 | 4/2006 | Scholz et al. |
| 7,440,895 B1 | 10/2008 | Miller et al. |
| 7,546,576 B2 | 6/2009 | Egli |
| 7,729,919 B2 | 6/2010 | Wang |
| 8,160,883 B2 | 4/2012 | Lecoeuche |
| 9,123,336 B1 | 9/2015 | Uszkoreit et al. |
| 9,384,732 B2 | 7/2016 | Bishop et al. |
| 9,412,392 B2 | 8/2016 | Lindahl |
| 9,479,831 B2 | 10/2016 | Oostveen et al. |
| 10,007,500 B1 | 6/2018 | Suraci |
| 2002/0032564 A1 | 3/2002 | Ehsani et al. |
| 2003/0212561 A1 | 11/2003 | Williams et al. |
| 2005/0010418 A1 | 1/2005 | McNair et al. |
| 2005/0010892 A1 | 1/2005 | McNair et al. |
| 2005/0135338 A1 | 6/2005 | Chiu et al. |
| 2005/0240917 A1 | 10/2005 | Wu |
| 2005/0261903 A1* | 11/2005 | Kawazoe ............... G10L 15/065 704/247 |
| 2006/0294509 A1 | 12/2006 | Mital et al. |
| 2008/0021708 A1 | 1/2008 | Bennett et al. |
| 2008/0221715 A1 | 9/2008 | Krzyzanowski et al. |
| 2009/0249206 A1 | 10/2009 | Stahlberg |
| 2009/0307162 A1 | 12/2009 | Bui et al. |
| 2010/0036676 A1 | 2/2010 | Safdi et al. |
| 2010/0088100 A1 | 4/2010 | Lindahl |
| 2012/0035932 A1 | 2/2012 | Jitkoff et al. |
| 2012/0066600 A1 | 3/2012 | Nickel |
| 2012/0209613 A1 | 8/2012 | Agapi et al. |
| 2013/0329086 A1 | 12/2013 | Malone |
| 2014/0074481 A1 | 3/2014 | Newman |
| 2014/0074483 A1 | 3/2014 | van Os |
| 2014/0108013 A1 | 4/2014 | Di Cristo et al. |
| 2014/0115456 A1 | 4/2014 | White et al. |
| 2014/0136187 A1 | 5/2014 | Wolverton et al. |
| 2014/0278413 A1 | 9/2014 | Pitschel et al. |
| 2014/0297282 A1 | 10/2014 | Peters et al. |
| 2015/0032451 A1 | 1/2015 | Gunn et al. |
| 2015/0089373 A1 | 3/2015 | Dwivedi et al. |
| 2015/0120723 A1 | 4/2015 | Deshmukh et al. |
| 2015/0242385 A1 | 8/2015 | Bao et al. |
| 2015/0248730 A1 | 9/2015 | Pilot et al. |
| 2015/0302850 A1 | 10/2015 | Lebrun |
| 2015/0317310 A1* | 11/2015 | Glass ................... G06F 16/248 707/706 |
| 2015/0348551 A1 | 12/2015 | Gruber et al. |
| 2016/0077853 A1 | 3/2016 | Feng et al. |
| 2016/0225370 A1 | 8/2016 | Kannan et al. |
| 2016/0225371 A1* | 8/2016 | Agrawal ............... G10L 15/075 |
| 2016/0259623 A1 | 9/2016 | Sumner et al. |
| 2016/0358603 A1 | 12/2016 | Azam et al. |
| 2016/0378439 A1 | 12/2016 | Straub et al. |
| 2017/0069177 A1 | 3/2017 | Takahata et al. |
| 2017/0093781 A1 | 3/2017 | Sharma et al. |
| 2017/0193123 A1 | 7/2017 | Jones et al. |
| 2018/0308476 A1 | 10/2018 | Hirzel et al. |

OTHER PUBLICATIONS

Non-Final Office Action dated Nov. 29, 2019 in U.S. Appl. No. 15/936,001, 16 pages.

First Action Interview Preinterview Communication dated Jan. 15, 2020 in U.S. Appl. No. 15/984,122, 5 pages.

First Action Interview Preinterview Communication dated Jan. 16, 2020 in U.S. Appl. No. 16/110,108, 5 pages.

International Preliminary Report on Patentability dated Aug. 2, 2019 in International Patent Application No. PCT/US2018/033518, 17 pages.

International Preliminary Report on Patentability dated Aug. 19, 2019 in International Patent Application No. PCT/US2018/033425, 18 pages.

International Search Report and Written Opinion dated Oct. 21, 2019 in International Patent Application No. PCT/US19/42453, 14 pages.

First Action Interview Preinterview Communication dated Oct. 9, 2019 in U.S. Appl. No. 16/110,103, 3 pages.

Preinterview First Office Action dated Feb. 13, 2020 in U.S. Appl. No. 16/261,657, 5 pages.

Non-Final Office Action dated Feb. 25, 2020 in U.S. Appl. No. 15/936,007, 29 pages.

First Action Interview Office Action dated Mar. 2, 2020 in U.S. Appl. No. 15/984,122, 3 pages.

First Action Interview Office Action dated Mar. 3, 2020 in U.S. Appl. No. 16/038,993, 16 pages.

First Action Interview Office Action dated Mar. 16, 2020 in U.S. Appl. No. 16/110,108, 6 pages.

\* cited by examiner

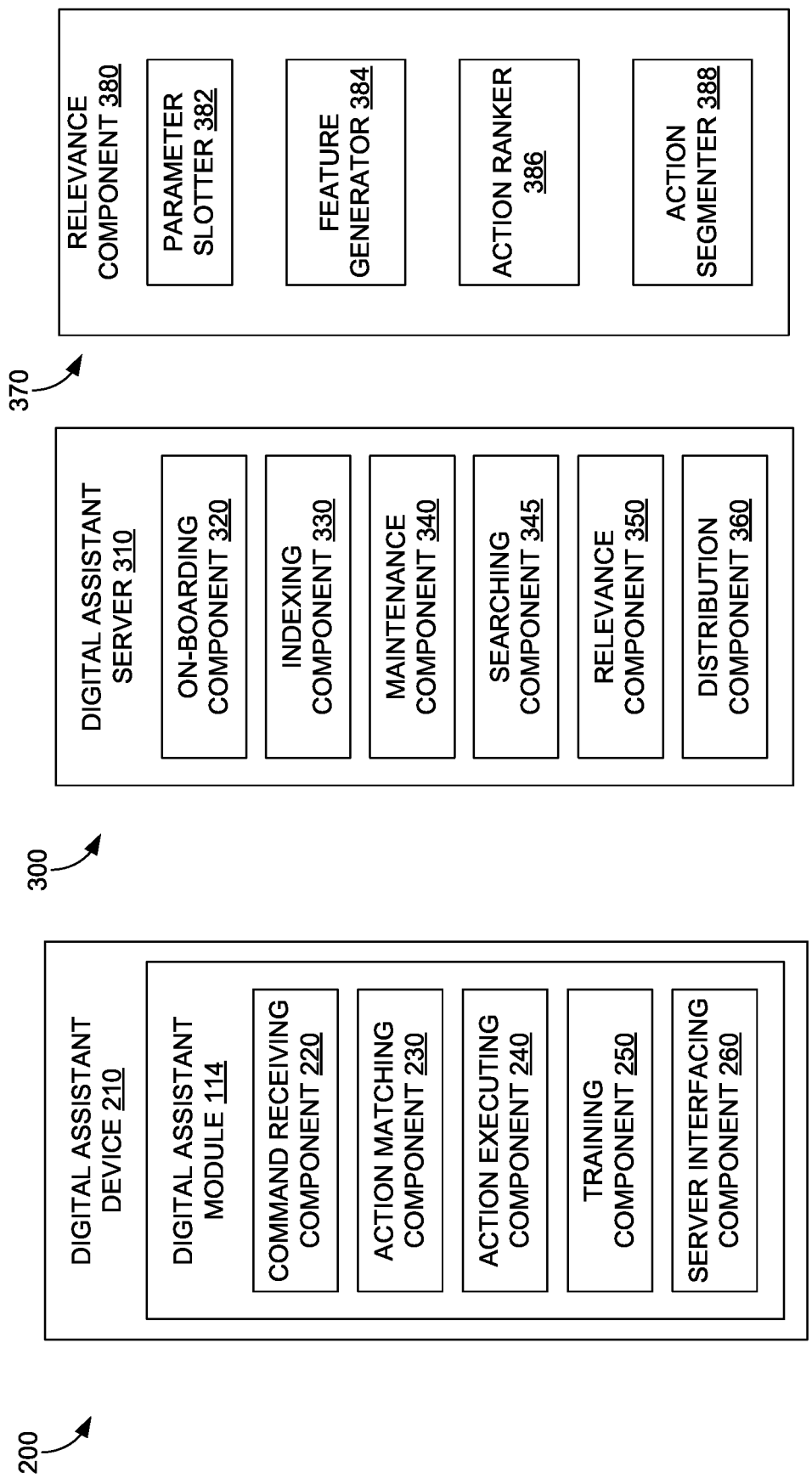

IDENTIFYING PARAMETER VALUES AND DETERMINING FEATURES FOR BOOSTING RANKINGS OF RELEVANT DISTRIBUTABLE DIGITAL ASSISTANT OPERATIONS

CROSS-REFERENCE TO RELATED APPLICATIONS

This application is a continuation-in-part of U.S. patent application Ser. No. 15/984,122, filed May 18, 2018, entitled CROWDSOURCED ON-BOARDING OF DIGITAL ASSISTANT OPERATIONS, which claims the benefit of U.S. Provisional Patent Application No. 62/508,181, filed May 18, 2017, entitled SYSTEM AND METHOD FOR CROWDSOURCED ACTIONS AND COMMANDS. This application is also is a continuation-in-part of U.S. patent application Ser. No. 16/047,782, filed Jul. 27, 2018, entitled RANKING AND BOOSTING RELEVANT DISTRIBUTABLE DIGITAL ASSISTANT OPERATIONS, which claims the benefit of U.S. Provisional Patent Application No. 62/576,800, filed Oct. 25, 2017, entitled A CROWDSOURCED DIGITAL ASSISTANT SERVER AND METHODS, and also to U.S. Provisional Patent Application No. 62/580,444, filed Nov. 1, 2017, entitled AUTOMATED METHOD TO CREATE DISCOURSES FROM USER COMMANDS, each of which are assigned or under obligation of assignment to the same entity as this application, the entire contents of each being herein incorporated by reference.

BACKGROUND

Digital assistants have become ubiquitously integrated into a variety of consumer electronic devices. Modern day digital assistants employ speech recognition technologies to provide a conversational interface between users and electronic devices. These digital assistants can employ various algorithms, such as natural language processing, to improve interpretations of commands received from a user. Consumers have expressed various frustrations with conventional digital assistants due to privacy concerns, constant misinterpretations of spoken commands, unavailability of services due to weak signals or a lack of signal, and the general requirement that the consumer must structure their spoken command in a dialect that is uncomfortable for them.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The described embodiments describe a digital assistant system including devices that facilitate the development of a crowd-sourced digital assistant. Users of the digital assistant system can easily contribute to the development of a language model and reproducible digital assistant operations, by easily recording desired operations and related commands on their respective digital assistant devices. Moreover, the users can benefit from the contribution of any other digital assistant device participating on the network of the digital assistant system, seamlessly, by speaking a command to their digital assistant device, which can then identify a corresponding previously-recorded operation to reproduce. Additional detail on such a digital assistant system can be found in U.S. patent application Ser. Nos. 15/935,983, 15/984,122, 15/988,620, 15/936,013, 16/038,993, and 16/047782, each of which is herein incorporated by reference by the entirety. By way of background, a digital assistant system described in accordance with the present disclosure can employ crowd-sourced digital assistant commands and actions that can be distributed to one or more digital assistant devices. Crowd-sourced data can include, among other things, action datasets that include or correspond to reproducible computing events and associated commands that can be employed to invoke a reproduction of computing events on computing devices having the crowd-sourced digital assistant installed and/or executing thereon. Crowd-sourced data can also include command templates, or groups thereof, which can include keywords, phrases, parameter fields, and other related information or metadata, any of which can be employed by a digital assistant device or a server for comparison to a received command to select one or more relevant action datasets.

Embodiments described in the present disclosure are generally directed towards techniques for effectively selecting relevant action datasets for communication to a digital assistant device based on a command received from the digital assistant device. More specifically, the relevant action datasets are based on the received command, as well as one or more parameters that are matched to the actions in the action datasets. In other words, based on a command communicated from a digital assistant device to a digital assistant server, one or more determined most-relevant action datasets or portions thereof can be identified, selected, and communicated to the digital assistant device so that an "action" (e.g., a set of operations or events) can be reproduced by the digital assistant. In some embodiments, a set of relevant (or candidate) action datasets are determined, as well as ranked and/or categorized, based on the parameters that are matched to the relevant action datasets. At least a portion of the parameter matching may be based on information included in the command communicated to the digital assistant.

In various embodiments, a set of candidate relevant action datasets are received at a server device (e.g., a digital assistant server) from a client device (e.g., a digital assistant device). Each of the set of candidate relevant action datasets may be based on and/or corresponding to a command received by the client device. The set of candidate relevant action datasets may be ranked based an initial and/or preliminary score generated by a search component. For example, a search component of the server device may search for action datasets that correspond to the received command. The search component may generate an initial score and/or a corresponding ranking of the set of candidate relevance action datasets based on the relevance of the candidate relevant action datasets to the received command. One or more parameters and/or parameter values are slotted, matched, and/or selected for various parameter fields associated with one or more command templates of the candidate relevant action datasets. The parameters may be selected based on the received command and rules, heuristics, or other deep knowledge of the server device. For example, keywords, which indicate parameter values, that are included in the command may be slotted in the parameter fields based on various rules and heuristics. Action features may be generated for the candidate relevant actions based on the selected parameters. A secondary score may be generated for the candidate relevant action datasets based on the generated features. A final score for each candidate relevant actions dataset may be generated based on a combination of the initial and primary scores. The ranking of the set of candidate relevant action datasets may be updated based on the secondary score, the final scores, and/or a combination thereof of the candidate relevant action datasets. The set of candidate relevant action datasets may be segmented into one or more classes and/or categories based on the generated features. One of more the candidate relevant action datasets, included the one or more selected parameter values, may be provided to the client device based on the updated ranking, the action features, and/or the selected parameter values.

More specifically, in one embodiment, a set of candidate relevant action datasets may be received, at the service device, from the client device. Each candidate relevant action dataset of the set of candidate relevant action datasets may correspond to at least a portion of a command received at the client device. Each candidate relevant action dataset may be associated with a command template that includes a set of parameter fields for the associated action dataset. For each parameter field of the set of parameter fields, one or more parameter values are determined based on the command As noted above, determining the parameters values may be further based on one or more rules and/or heuristics. For each candidate relevant action dataset of the set of relevant action dataset, one or more action features are generated the generated action features may be based on the command and the one or more determined parameters values for each parameter field of set of parameter fields for the command template associated with each action dataset of the set of action datasets. A ranking for the set of candidate relevant action datasets may be determined and/or updated. The updated ranking of the set of candidate relevant action datasets may be based on the action features generated for the candidate relevant action datasets of the set of candidate relevant action datasets. A category and/or classification for each candidate relevant action dataset may be determined and/or identified based on the generated action features for the candidate relevant action datasets. One or more of the candidate relevant actions datasets of the set of action datasets may be provided, to the digital assistant device, based on the updated ranking of the set of candidate relevant action datasets and/or the classification for each candidate relevant action dataset of the set of candidate relevant action datasets. Each candidate relevant action dataset of the provided one or more candidate relevant action datasets includes the determined one or more parameter values for the command template associated with the provided action dataset.

In some embodiments, each of candidate relevant action dataset of the set of candidate relevant action datasets may be relevant to the command and is a candidate action dataset that matches the command. On or more keywords that are included in the command may be determined and/or identified. Based on one or more rules and/or heuristics, the one or more determined keywords may be slotted into at least a portion of the set of parameter fields for the command templates associated with at least one action dataset. Based on a likelihood score associated with the slotted one or more keywords, the one or more parameter values for each parameter field of the set of parameter fields for the command template may be determined.

At least one of the one or more generated action features may indicate whether a parameter value has been determined for each parameter field of the set of parameter fields for the command template. In some embodiments, at least one of the one or more generated action features may indicate whether an application corresponding to the action dataset is installed on the digital assistant device.

Each candidate relevant action dataset of the received set of action datasets may include a preliminary score. In some embodiments, a secondary score for each candidate relevant action dataset of the set of candidate relevant action datasets is determined based on the one or more action features generated for the action dataset. A final score for each candidate relevant action dataset of the set of candidate relevant action datasets may be determined based on a combination of the preliminary score and the secondary score for the action dataset. The ranking of the set of candidate relevant action datasets may be determined based on the final score for each candidate relevant action dataset of the set of candidate relevant action datasets. The one or more candidate relevant action datasets may be identified to provide to the digital assistant based on each of the identified one or more action datasets having a parameter value determined for each parameter field of the set of parameter fields of the associated command template.

BRIEF DESCRIPTION OF THE DRAWINGS

The present invention is described in detail below with reference to the attached drawing figures, wherein:

FIG. 2 is a block diagram of an exemplary digital assistant device, in accordance with an embodiment of the present disclosure;

FIG. 3A is a block diagram of an exemplary digital assistant server, in accordance with an embodiment of the present disclosure;

FIG. 3B is a block diagram of an exemplary relevance component that may be included in the digital assistant server of FIG. 3A, in accordance with an embodiment of the present disclosure;

DETAILED DESCRIPTION

Figure 1:
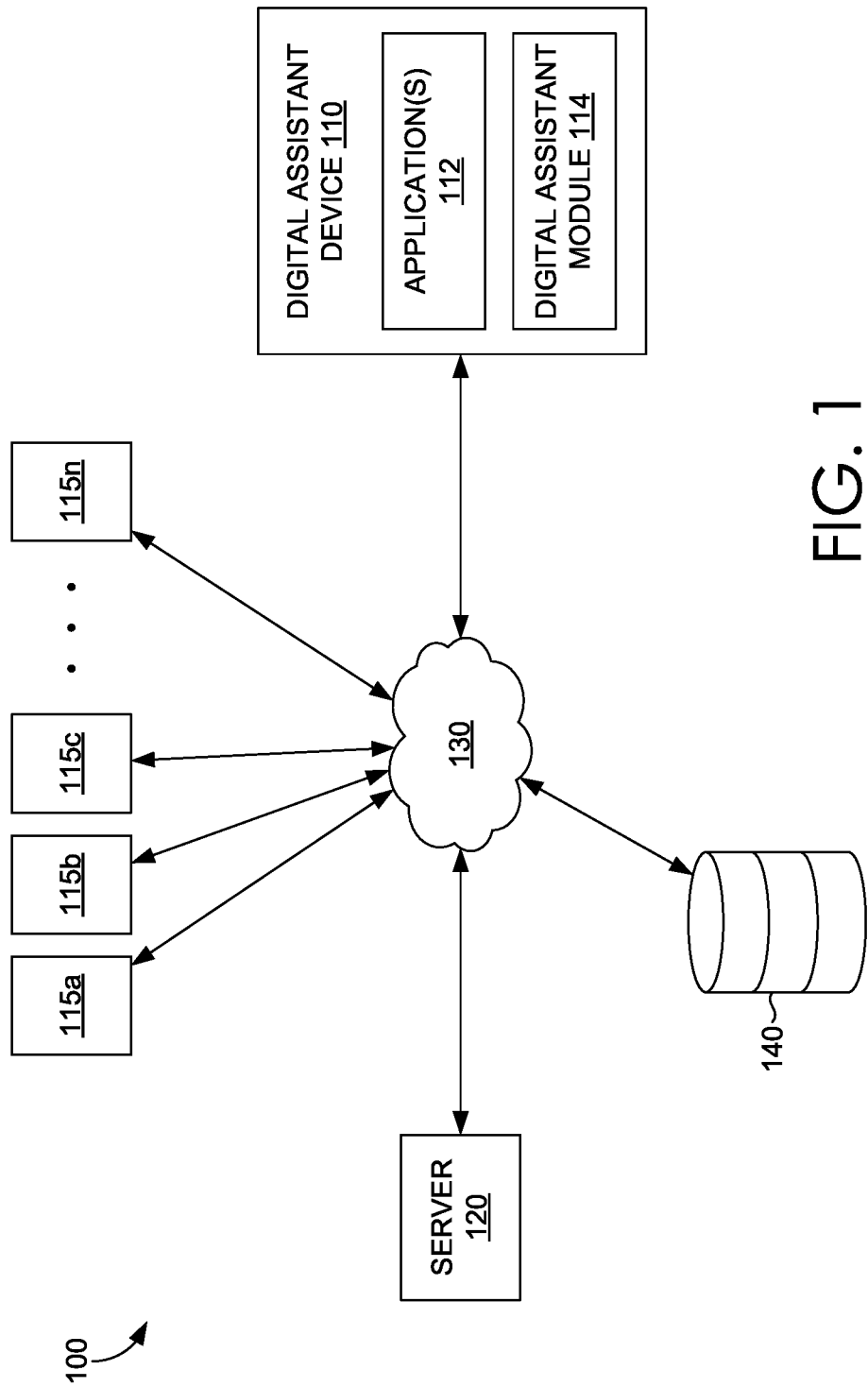
FIG. 1 is a block diagram of an exemplary computing environment for a crowd-sourced digital assistant system, in accordance with embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are generally directed towards systems and methods for effectively interpreting the intent of received commands, by way of a digital assistant in accordance with the present disclosure. Users of digital assistants may oftentimes provide ambiguous commands to their digital assistant devices. Such ambiguities can be a result of any variety of reasons, such as mumbled speech, background noise, incomplete phrasing or terms, poor grammar, and the like. While conventional digital assistants generally require users to dictate predefined commands in a manner that the digital assistant can understand, it would be preferable to provide a digital assistant that can effectively understand ambiguities in, or predict likely interpretations of, the user's spoken commands The described embodiments are generally related to a digital assistant server device and techniques employed to disambiguate received user commands to prioritize various interpretations and actions that can be performed on the user's digital assistant device.

In accordance with the present disclosure, an "operation" can correspond to a final result, output, or computing operation that is generated, executed, or performed by a digital assistant device based on one or more action datasets selected and interpreted for execution by the digital assistant device. An "action dataset" can be comprised of one or more instructions that can be interpreted to reproduce operations in response to a received command determined to correspond to the action dataset. In accordance with embodiments described herein, an "action" is described in reference to an operation that is performed in response to an action dataset selected and interpreted for execution. In this regard, an action, by way of a corresponding action dataset, can be performed, invoked, initiated, or executed, among other things. Any reference to an invocation or performance of an "action" can imply that a corresponding action dataset is selected and interpreted for execution (e.g., invoked) by the digital assistant device to reproduce a corresponding set operation(s).

In some embodiments, actions (or the action datasets corresponding thereto) can be created, by the digital assistant device, which can record a series of detected events (e.g., inputs) that are typically provided by a user of the digital assistant device when manually invoking the desired operation (e.g., with manual inputs via a touchscreen or other input method of the digital assistant device). That is, to create a new action dataset, the digital assistant device can invoke a recording mode where a user can simply perform a series of computing operations (e.g., manual touches, click inputs) within one or more applications to achieve a desired result or operation. After the recording is stopped by the user, via a terminating input, the action dataset can store and be associated with a set of command templates corresponding to commands that the user would preferably announce to the digital assistant device when an invocation of the operation is desired. In various embodiments, a command representation can be received as speech data and converted to text (e.g., by a speech engine of the digital assistant device), or received as text input data. In accordance with embodiments described herein, a "command" is referenced herein to describe data, received as speech data or as text data. A "command representation," on the other hand is referenced to describe text data that is received, based on inputs (e.g., keyboard), received speech data converted to text data, or received text data communicated from another computing device. A "command template" is referenced herein to describe a portion of a command representation having defined parameter fields in place of variable terms.

As used herein, the term "set" may be employed to refer to an ordered (i.e., sequential) or an unordered (i.e., non-sequential) collection of objects (or elements), such as but not limited to data elements (e.g., actions and/or action datasets). A set may include N elements, where N is any non-negative integer. That is, a set may include 0, 1, 2, 3, . . . N objects and/or elements, where Nis an positive integer with no upper bound. Therefore, as used herein, a set may be a null set (i.e., an empty set), that includes no elements. A set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

In more detail, one or more terms, keywords, strings, tokens, or other information can be defined as a parameter of an action dataset. In some embodiments, the one or more terms, keywords, strings, tokens, or other information that may be defined as a parameter may be included in the received command However, the one or more terms, keywords, strings, tokens, or other information that may be defined as a parameter may be inferred, determined, and/or generated based on data included in the received command, the context of the command, and/or other information as discussed herein. A "parameter," in accordance with the present disclosure, can be referenced as corresponding to one of a plurality of predefined parameter types, such as but not limited to, genre, artist, title, location, name or contact, phone number, address, city, state, country, day, week, month, year, and more. It is also contemplated that the digital assistant device can access from a memory, or retrieve (e.g., from a server), a set of predefined parameter types that are known or determined to correspond to the application or applications for which an action dataset is being created. In some embodiments, the set of predefined parameter types can be determined based at least in part on corresponding application identifying information. The digital assistant device can extract, based on the defined parameters, the corresponding keywords and generate a command template based on the remaining terms and the defined parameters. By way of example only, if the command was originally received as "play music by Coldplay," and the term "Coldplay" is defined as a parameter of type "artist," a resulting command template generated by the digital assistant device may appear as "play music by <artist>". In this regard, a command template may include the originally received command terms if no parameters are defined, or may include a portion of the originally received command terms with parameter fields defined therein, the defined parameters corresponding to variable terms of a command.

The digital assistant device can receive, among other things, application identifying information, a recorded series of events, and a set command templates, among other things, to generate a new action dataset that can be retrieved, interpreted and/or invoked by the digital assistant device, simply based on a determination, by the digital assistant device, that a received command or command representation is associated with the action dataset. When an action is invoked based on a determination that a received command or command representation corresponds to an action dataset, the digital assistant device can reproduce (e.g., emulate, invoke, execute, perform) the recorded series of events associated with the corresponding action dataset, thereby performing the desired operation. Moreover, in circumstances where a received command or command representation includes a parameter term, and a determination is made that the received command or command representation corresponds to an action dataset having a parameter field that also corresponds to the parameter term, the parameter term can be employed, by the digital assistant device, to perform custom operations while performing the action. For instance, the digital assistant device can input the parameter term as a text input into a field of the application.

In some further embodiments, an action dataset, once created by the digital assistant device, can be uploaded (hereinafter also referenced as "on-boarded") to a remote server for storage thereby. The action dataset can be on-boarded automatically upon its generation or on-boarded manually based on a received instruction, by the digital assistant device. It is contemplated that individuals may want to keep their actions or command templates private, and so an option to keep an action dataset limited to locally-storage may be provided to the user (e.g., via a GUI element). The server, upon receiving an on-boarded action dataset, can analyze the action dataset and generate an associated action signature based on the characteristics and/or contents of the action dataset. Contents of an action dataset can include, among other things, application identifying information, corresponding command templates and parameters, and a recorded series of events. The action signature can be generated by various operations, such as hashing the on-boarded action dataset with a hashing algorithm, by way of example. It is also contemplated that the action signature can be generated by the on-boarding digital assistant device, the generated action signature then being stored in or appended to the action dataset before it is uploaded to the server.

In one aspect, the server can determine that the on-boarded action dataset already exists on the server, based on a determination that the action signature corresponds to the action signature of another action dataset already stored on the server. The server can either dispose of the on-boarded action dataset or merge the on-boarded action dataset (or determined differing portion(s) thereof) with an existing action dataset stored thereby, preventing redundancy and saving storage space. In another aspect, the server can analyze the on-boarded action dataset to determine if its contents (e.g., the recorded events, command templates, metadata) comply with one or more defined policies (e.g., inappropriate language, misdirected operations, incomplete actions) associated with general usage of the digital assistant system. In another aspect, the server can employ machine learning algorithms, among other things, to perform a variety of tasks, such as determining relevant parameter types, generating additional command templates for association with an on-boarded or stored action dataset, comparing similarity of events between on-boarded action datasets to identify and select more efficient routes for invoking an operation, and more.

In some further embodiments, the server can distribute one or more stored actions datasets to a plurality of digital assistant devices in communication with the server. In this way, each digital assistant device can receive action datasets or portions thereof (e.g., command templates) from the server. The action datasets can be distributed to the digital assistant devices in a variety of ways. For instance, in an embodiment, the server can freely distribute any or all determined relevant action datasets to digital assistant devices. In an embodiment, an application profile including a list of applications installed on a digital assistant device can be communicated to the server. Based on the application profile for the digital assistant device, the server can distribute any or all determined relevant action datasets to the digital assistant device. As digital assistant devices can include a variety of operating systems, and versions of applications installed thereon can also vary, it is contemplated that the application profile communicated by a digital assistant device to the server may include operating system and application version information, among other things, so that appropriate and relevant action datasets are identified by the server for distribution to the digital assistant device. For a more granular implementation, an action dataset profile including a list of action datasets or action signatures stored on the digital assistant device can be communicated to the server. In this way, only missing or updated action datasets can be distributed to the digital assistant device.

In some further aspects, the server can receive a command or command representation communicated from any digital assistant device. The command or command representation can be provided to the server as a request to receive, based on the communicated command or command representation, a corresponding action dataset for invocation by the digital assistant device. In various embodiments, the server can search a plurality of stored command templates associated with stored action datasets to determine whether any one or more command templates correspond to the received command or command representation. In order to improve the disambiguation of commands that are unclear or ambiguous, the server can employ, among other things, information extracted from the command or command representation to facilitate the disambiguation process. More specifically, the server can have a defined set of rules stored in memory, with each rule having a relative priority to the other rules. When a command or command representation is received by the server, the server can employ a search engine that searches the action datasets and/or associated command templates stored by the server. It is contemplated that a search result generated by the search engine as a result of the search may return a plurality of action datasets determined potentially relevant to the searched command or command representation. In various embodiments, the server can evaluate each search result (e.g., each action dataset and/or associated command template) in light of the defined set of rules to assign the search result a series of scores (e.g., a modifier) to indicate its relative priority to the other search results. By evaluating the potentially-relevant action datasets and/or associated command templates against the defined set of rules along with the received command or command representation, a most-relevant action dataset can be determined for selection and communication to the requesting digital assistant device.

In some embodiments, a user can simply announce a command to the digital assistant device, and if a corresponding action dataset is not stored on the digital assistant device, the digital assistant device can send the command (or representation) to the server for determination and selection of a set of relevant action datasets, which can then be communicated to the digital assistant device. Provided that the digital assistant device has the corresponding application installed thereon, the digital assistant device can retrieve, from the server, a set of determined most relevant action datasets, without additional configuration or interaction by the user, also reducing server load and saving bandwidth by inhibiting extraneous transfer of irrelevant action datasets. A retrieved set of relevant action datasets can be received from the server for invocation by the digital assistant device. It is further contemplated that if two or more action datasets are determined equally relevant to a received command, each action dataset or reference thereto may be retrieved from the server, and the digital assistant device can provide for display a listing of the determined relevant action datasets for selection and subsequent execution. In other words, if two or more action datasets are determined relevant to the received command, the digital assistant device can request a selection from a user, and receive a selection for a desired action dataset of the two or more determined relevant action datasets. If the determined relevant action datasets are each communicated to the digital assistant device, the digital assistant device can receive the selection and invoke the selected action dataset. Alternatively, the selection can be communicated to the server, so that the selected action dataset is communicated to the digital assistant device for invocation.

In some further embodiments, a user of a digital assistant device can customize command templates associated with an action dataset corresponding to an application installed on their digital assistant device. Put simply, a user can employ the digital assistant (or a GUI thereof) to select an action dataset from a list of action datasets stored on the computing device, select an option to add a new command to the action dataset, and define a new command and any associated parameters for storage in the action dataset. In this regard, the user can add any custom command and parameter that can later be understood by the digital assistant device to invoke the action. In some aspects, the custom command and/or modified action can be on-boarded to the server for analysis and storage, as noted above. In some further aspects, based on the analysis, the server can distribute the custom command and/or at least a portion of the modified action dataset to a plurality of other digital assistant devices. In this regard, the list of understandable commands and corresponding actions can continue to grow and evolve, and be automatically provided to any other digital assistant device.

In various embodiments, a set of candidate relevant action datasets are received at a server device (e.g., a digital assistant server) from a client device (e.g., a digital assistant device). Each of the set of candidate relevant action datasets may be based on and/or corresponding to a command received by the client device. The set of candidate relevant action datasets may be ranked based an initial and/or preliminary score generated by a search component. For example, a search component of the server device may search for action datasets that correspond to the received command. The search component may generate an initial score and/or a corresponding ranking of the set of candidate relevance action datasets based on the relevance of the candidate relevant action datasets to the received command. One or more parameters and/or parameter values are slotted, matched, and/or selected for various parameter fields associated with one or more command templates of the candidate relevant action datasets. The parameters may be selected based on the received command and rules, heuristics, or other deep knowledge of the server device. For example, keywords, which indicate parameter values, that are included in the command may be slotted in the parameter fields based on various rules and heuristics. Action features may be generated for the candidate relevant actions based on the selected parameters. A secondary score may be generated for the candidate relevant action datasets based on the generated features. A final score for each candidate relevant actions dataset may be generated based on a combination of the initial and primary scores. The ranking of the set of candidate relevant action datasets may be updated based on the secondary score, the final scores, and/or a combination thereof of the candidate relevant action datasets. The set of candidate relevant action datasets may be segmented into one or more classes and/or categories based on the generated features. One of more the candidate relevant action datasets, included the one or more selected parameter values, may be provided to the client device based on the updated ranking, the action features, and/or the selected parameter values.

Accordingly, at a high level and with reference to FIG. 1, an example operating environment 100 in which some embodiments of the present disclosure may be employed is depicted. It should be understood that this and other arrangements and/or features described by the enclosed document are set forth only as examples. Other arrangements and elements (e.g., machines, interfaces, functions, orders, and groupings of functions, etc.) or features can be used in addition to or instead of those described, and some elements or features may be omitted altogether for the sake of clarity. Further, many of the elements or features described in the enclosed document may be implemented in one or more components, or as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

The system in FIG. 1 includes one or more digital assistant devices 110, 115a, 115b, 115c, . . . 115n, in communication with a server 120 via a network 130 (e.g., the Internet). In this example, the server 120, also in communication with the network 130, is in communication with each of the digital assistant devices 110, 115a-115n, and can also be in communication with a database 140. The database 140 can be directly coupled to the server 120 or coupled to the server 120 via the network 130. The digital assistant device 110, representative of other digital assistant devices 115a-115n, is a computing device comprising one or more applications 112 and a digital assistant module 114 installed and/or executing thereon.

The one or more applications 112 includes any application that is executable on the digital assistant device 110, and can include applications installed via an application marketplace, custom applications, web applications, side-loaded applications, applications included in the operating system of the digital assistant device 110, or any other application that can be reasonably considered to fit the general definition of an application or mobile application. On the other hand, the digital assistant module 114 can provide digital assistant services installed on the digital assistant device 110 or provided by the server 120 via the network 130, or can be implemented at least partially into an operating system of the digital assistant device 110. In accordance with embodiments described herein, the digital assistant module 114 provides an interface between a digital assistant device 110 and an associated user (not shown), generally via a speech-based exchanged, although any other method of exchange between user and digital assistant device 110 (e.g., keyboard input, communication from another digital assistant device or computing device) remains within the purview of the present disclosure.

When voice commands are received by the digital assistant device 110, the digital assistant module 114 can convert the speech command to text utilizing a speech-to-text engine (not shown) to extract identified terms and generate a command representation. The digital assistant module 114 can receive the command representation, and determine that the command representation corresponds to at least one command template of at least one action dataset stored on the digital assistant device. In some embodiments, the digital assistant module 114 can generate an index of all command templates stored on the digital assistant device 110 for faster searching and comparison of the received command representation to identify a corresponding command template, and thereby a corresponding action dataset. Each indexed command template can be mapped to a corresponding action dataset, which can be interpreted for execution in response to a determination of a confirmed match with the received command representation.

By way of brief overview, a command template can include one or more keywords and/or one or more parameters that each have a corresponding parameter type. Each command template generally corresponds to an operation that can be performed on one or more applications 112 installed on a digital assistant device 110. Moreover, a plurality of command templates can correspond to a single operation, such that there are multiple equivalent commands that can invoke the same operation. By way of example only, commands such as "check in," check into flight," "please check in," "check into flight now," "check in to flight 12345," and the like, can all invoke the same operation that, by way of example only, directs the digital assistant module 114 to execute an appropriate airline application on the digital assistant device 110 and perform a predefined set of events or computer operations to achieve the same result.

The aforementioned commands, however, may lack appropriate information (e.g., the specific airline). As one of ordinary skill may appreciate, a user may have multiple applications 112 from various vendors (e.g., airlines) associated with a similar service (e.g., checking into flights). A digital assistant device 110 in accordance with embodiments described herein can provide features that can determine contextual information associated with the digital assistant device 110, or its associated user, based on historical use of the digital assistant device 110, profile information stored on the digital assistant device 110 or server 120, stored parameters from previous interactions or received commands, indexed messages (e.g., email, text messages) stored on the digital assistant device, and a variety of other types of data stored locally or remotely on a server, such as server 120, to identify a most relevant parameter and supplement a command to select a most relevant action dataset. More specific commands, such as "check into FriendlyAirline flight," or "FriendlyAirline check in," and the like, where a parameter is specifically defined in the command, can be recognized by the digital assistant module 114.

One or more recognizable commands and corresponding action datasets can be received by the digital assistant device 110 from the server 120 at any time, including upon installation, initialization, or invocation of the digital assistant module 114, after or upon receipt of a speech command by the digital assistant module 114, after or upon installation of a new application 112, periodically (e.g., once a day), when pushed to the digital assistant device 110 from the server 120, among many other configurations. It is contemplated that the action datasets received by the digital assistant device 110 from the server 120 can be limited based at least in part on the applications 112 installed on the digital assistant device 110, although configurations where a larger or smaller set of action datasets received are contemplated.

In the event an action dataset is determined not available for a particular application 112 installed on the digital assistant device 110, digital assistant module 114 can either redirect the user to a marketplace (e.g., launch an app marketplace application) to install the appropriate application determined by the server 120 based on the received command, or can invoke an action training program that prompts a user to manually perform tasks on one or more applications to achieve the desired result, the tasks being recorded and stored into a new action dataset by the digital assistant device 110. The digital assistant module 114 can also receive one or more commands from the user (e.g., via speech or text) to associate with the action dataset being generated. If the command includes variable parameters (e.g., optional fields), the action training program can facilitate a definition of such parameters and corresponding parameter types to generate command templates for inclusion in the action dataset being generated. In this way, a command template(s) is associated with at least the particular application designated by the user and also corresponds to the one or more tasks manually performed by the user, associating the generated command template to the task(s) and thus the desired resulting operation.

In some instances, the server 120 can provide one or more determined most-relevant action datasets to the digital assistant device 110 based on the received command As described, the server 120 can store and index a constantly-growing and evolving plurality of crowd-sourced action datasets submitted by or received from any of digital assistant devices 115a-115n also independently having a digital assistant module 114 and any number of applications 112 installed thereon. The digital assistant devices 115a-115n may have any combination of applications 112 installed thereon, and any generation of action datasets performed on any digital assistant device 110, 115-115n can be communicated to the server 120 to be stored and indexed for mass or selective deployment, among other things. In some aspects, the server 120 can include any variety of search engines, relevance engines, and/or machine-learned algorithms to provide a level of quality assurance on command templates included in on-boarded action datasets and/or the tasks and operations performed before they are distributed to other digital assistant devices via the network 130.

When the digital assistant module 114 receives, from the server 120, or locally selects a relevant action dataset based on the communicated command or command representation, the digital assistant module 114 can generate an overlay interface that can mask any or all visual outputs associated with the determined action or the computing device generally. The generation of the overlay interface can include a selection, by the digital assistant module 114, of one or more user interface elements that are stored in a memory of the digital assistant device 110 or server 120, and/or include a dynamic generation of the user interface element(s) by the digital assistant module 114 or server 120 based on one or more portions of the received command, command representation, and/or obtained contextual data (e.g., determined location data, user profile associated with the digital assistant device 110 or digital assistant module 114, historical data associated with the user profile, etc.) obtained by the digital assistant device 110, digital assistant module 114, and/or server 120. The selected or generated one or more user interface elements can each include content that is relevant to one or more portions (e.g., terms, keywords) of the received command or command representation. In the event of dynamic generation of user interface elements, such elements can be saved locally on the digital assistant device 110 or remotely on the server 120 for subsequent retrieval by the digital assistant device 110, or can be discarded and dynamically regenerated at any time.

Example operating environment depicted in FIG. 1 is suitable for use in implementing embodiments of the invention. Generally, environment 100 is suitable for creating, on-boarding, storing, indexing, crowd-sourcing, selecting, distributing, and invoking actions or action datasets. Environment 100 includes digital assistant device 110, digital assistant server device 120 (hereinafter also referenced as "server" or "digital assistant server") and network 130. Digital assistant device 110 can be any kind of computing device having a digital assistant module installed and/or executing thereon, the digital assistant module being implemented in accordance with at least some of the described embodiments. For example, in an embodiment, digital assistant device 110 can be a computing device such as computing device 700, as described below with reference to FIG. 7. In embodiments, digital assistant device 110 can be a personal computer (PC), a laptop computer, a workstation, a mobile computing device, a PDA, a cell phone, a smart watch or wearable, or the like. Any digital assistant device described in accordance with the present disclosure can include features described with respect to the digital assistant device 110. In this regard, a digital assistant device can include one or more applications 112 installed and executable thereon. The one or more applications 112 includes any application that is executable on the digital assistant device, and can include applications installed via an application marketplace, custom applications, web applications, side-loaded applications, applications included in the operating system of the digital assistant device, or any other application that can be reasonably considered to fit the general definition of an application. On the other hand, the digital assistant module 114 can be an application, a service accessible via an application installed on the digital assistant device or via the network 130, or implemented into a layer of an operating system of the digital assistant device 110. In accordance with embodiments described herein, the digital assistant module 114 can provide an interface between a digital assistant device 110 and a user (not shown), generally via a speech-based exchange, although any other method of exchange between user and digital assistant device may be considered within the purview of the present disclosure.

Similarly, digital assistant server device 120 ("server") can be any kind of computing device capable of facilitating the on-boarding, storage, management, indexing, searching, relevance determination, and distribution of crowd-sourced action datasets. For example, in an embodiment, digital assistant server device 120 can be a computing device such as computing device 700, as described below with reference to FIG. 7. In some embodiments, digital assistant server device 120 comprises one or more server computers, whether distributed or otherwise. Generally, any of the components of environment 100 may communicate with each other via a network 130, which may include, without limitation, one or more local area networks (LANs) and/or wide area networks (WANs). Such networking environments are commonplace in offices, enterprise-wide computer networks, intranets, and the Internet. The server 120 can include or be in communication with a data source 140, which may comprise data sources and/or data systems, configured to make data available to any of the various constituents of the operating environment 100. Data sources 140 may be discrete from the illustrated components, or any combination thereof, or may be incorporated and/or integrated into at least one of those components.

Referring now to FIG. 2, a block diagram 200 of an exemplary digital assistant device 210 suitable for use in implementing embodiments of the invention is shown. Generally, digital assistant device 210 (also depicted as digital assistant device 110 of FIG. 1) is suitable for receiving commands or command representations, selecting action datasets to execute by matching received commands to command templates of action datasets, or determining that no action datasets correspond to received commands, interpreting a selected action dataset to execute the associated operation, generating new action datasets, and sending action datasets to or receiving action datasets from a digital assistant server, such as server 120.

Digital assistant device 210 can include, among other things, a command receiving component 220, an action matching component 230, an action executing component 240, a training component 250, and a server interfacing component 260. The command receiving component 220 can receive a command, either in the form of speech data or text data. The speech data can be received via a microphone of the digital assistant device 210, or another computing device paired to or in communication with the digital assistant device 210. The command receiving component 220, after receiving the speech data, can employ a speech-to-text engine of the digital assistant device 210 to generate a command representation (e.g., a text string of the command) Text data received by command receiving component 220, on the other hand, can be received via a virtual keyboard or other input method of the digital assistant device 210, and similarly, can be received from another computing device paired to or in communication with the digital assistant device 210. Received text data is already in the form of a command representation, and is treated as such. In various embodiments, command receiving component 220 can be invoked manually by a user (e.g., via an input to begin listening for or receiving the command), or can be in an always-listening mode.

Based on a command representation being received, action matching component 230 can determine whether one or more action datasets stored on the digital assistant device 210 include a command template that corresponds to or substantially corresponds (e.g., at least 90% similar) to the received command representation. In some aspects, a corresponding command template can be identified, and the action dataset of which the corresponding command template is stored in is selected for interpretation by action executing component 240. In some other aspects, a corresponding command template cannot be identified, and either the training component 250 can be invoked, or the received command is communicated to the digital assistant server (depicted as server 120 of FIG. 1 and digital assistant server 310 of FIG. 3A) via the server interfacing component 260.

The action executing component 240 can receive a selected action dataset, either selected by digital assistant device 210 from local storage, by the digital assistant server from storage accessible thereto, or selected from a list presented by digital assistant device 210. The action executing component 240 can, from the received action dataset, interpret event data, which may include interpretable instructions, executable code, links, deep links, references to GUI elements, references to screen coordinates, field names, or other pieces of data that can correspond to one or more reproducible operations, tasks, or events associated with selected action dataset. When the event data is interpreted, the action executing component 240 can reproduce the operations that were recorded when the action dataset was initially generated, by any remote computing device, or any other digital assistant device such as digital assistant device 210. In some aspects, the event data can include time delays, URLs, deep links to application operations, or any other reproducible operation that can be accessed, processed, emulated, or executed by the action executing component 240. In some aspects, events such as clicks or touch inputs, can be reproduced on the digital assistant device 210, based on the interpreted event data stored in the invoked action dataset.

The training component 250 can facilitate the generation of an action dataset, among other things. When the training component 250 is invoked, an indication, such as a GUI element, indicating that an action recording session has begun may be presented for display. A prompt to provide the tasks or events required to perform the desired operation can also be presented for display. In this regard, a user can begin by first launching an application for which the operation is associated with, and proceed with providing inputs to the application (i.e., (performing the requisite tasks). The inputs can be recorded by the digital assistant device 210, and the training component 250 can listen for, parse, identify, and record a variety of attributes of the received inputs, such as long or short presses, time delays between inputs, references to GUI elements interacted with, field identifiers, application links activated based on received inputs (e.g., deep links), and the like. The recorded inputs and attributes (e.g., event data) can be stored, sequentially, in an event sequence, and stored into a new action dataset. The application launched is also identified, and any application identifying information, such as operating system, operating system version, application version, paid or free version status, and more, can be determined from associated metadata and also stored into the new action dataset. When the desired operation is completed (i.e., all requisite tasks/events performed), a user can activate a training termination button, which can be presented as a floating button or other input mechanism that is preferably positioned away from an active portion of the display. Other termination methods are also contemplated, such as voice activated termination, or motion activated termination, without limitation.

The training component 250 can further request that the user provide a set of commands that correspond to the desired operation. A command can be received via speech data and converted to a command representation by a speech to text engine, or received via text input as a command representation, among other ways. When the set of commands is provided and stored as command representations, the training component 250 can further prompt the user to define any relevant parameters or variables in the command representations, which can correspond to keywords or values that may change whenever the command is spoken. In this regard, a user may select one or more terms included in the received command representations, and define them with a corresponding parameter type selected from a list of custom, predefined, or determined parameter times, as described herein. The training component 250 can then extract the selected one or more terms from a command representation defined as parameter(s), replacing them with parameter field identifier(s) of a corresponding parameter type, and store the resulting data as a command template. The training component 250 can then generate the action dataset from the recorded event sequence, the application identifying information, and the one or more defined command templates. In some embodiments, the training component 250 can generate an action signature or unique hash based on the generated action dataset or one or more portions of data included therein. The action signature can be employed by the digital assistant server to determine whether the action dataset or data included therein is redundant, among other things.

Looking now to FIG. 3A, a block diagram 300 of an exemplary digital assistant server 310 suitable for use in implementing embodiments of the invention is shown. Generally, digital assistant server 310 (also depicted as server 120 of FIG. 1) is suitable for establishing connections with digital assistant device(s) 210, receiving generated action datasets, maintaining or indexing received action datasets, receiving commands or command representations from one or more digital assistant devices, searching action datasets maintained and/or stored in memory, determining relevance of searched action datasets, and distributing selected and/or determined relevant action datasets to digital assistant devices, such as digital assistant device 210. Digital assistant server 310 can include, among other things, an on-boarding component 320, an indexing component 330, a maintenance component 340, a searching component 345, a relevance component 350, and a distribution component 360, among other things.

The on-boarding component 320 can receive action datasets generated by one or more digital assistant devices 210 in communication therewith. In some aspects, the on-boarding component 320 can generate an action signature for a received action dataset, similar to how a digital assistant device may, as described herein above. Before storing the received action dataset, the action signature can be searched utilizing the indexing component 330, which maintains an index of all action datasets stored by the digital assistant server 310. The indexing component 330 facilitates quick determination of uniqueness of received action datasets, and reduces redundancy and processing load of the digital assistant server 310.

On a similar note, the maintenance component 340 can determine whether any portion of a received action dataset is different than action datasets already stored on or by the server (e.g., in a database), and extract such portions for merging into the existing corresponding action datasets. Such portions may be identified in circumstances where only command templates are hashed in the action signature, or where each portion of the action dataset (e.g., application identifying information, command template(s), event sequence) is independently hashed either by training component 250 of FIG. 2 or on-boarding component 320 of FIG. 3A, to more easily identify changes or differences between action datasets. By way of example, in some embodiments, a received action dataset can include separate hashes for its application identifying information, event sequence, and command template(s). In this regard, the digital assistant server 310 can employ the indexing component 330 and maintenance component 340 to quickly identify, for instance, that the received action data corresponds to a particular application and operation, or that the command template(s) are different than those stored in the stored action dataset by virtue of the command template hashes being different. Similarly, the independent hash signatures for each portion of data included in an action dataset can facilitate efficient determination of changes or differences between any combination of data portions in a received action dataset and a stored action dataset.

Searching component 345 can include a search engine or a search tool that receives a query, such as a command or command representation received from a digital assistant device, searches a memory (e.g., a database) of stored action datasets with the received query, and generates a search result including one or more potentially relevant action datasets identified based on the received query. In various embodiments, each search result can correspond to or include a potentially relevant action dataset, and can be generated based on a determination, by the searching component 345, that one or more command templates associated with the potentially relevant action dataset corresponds to the received command or command representation. In some embodiments, a command template can be determined to correspond to a received command or command representation based on a comparison of keywords, terms, parameters, or phrases in the received command or command representation to keywords, terms, phrases, parameter fields, or parameter types in the command template. Among other things, contextual data associated with a digital assistant device requesting the action dataset(s) can also be employed to determine corresponding command templates based on received commands or command representations. In various embodiments, the search result generated by searching component 345 may include a set of relevant (or candidate) action datasets. The search results (e.g., the set of relevant action datasets) may be a ranked set based on a preliminary (or initial) score, generated by searching component 345, for each of the search results. Searching component 345 may provide the ranked set of relevant action datasets to a relevance component, such as but not limited to relevance component 350 and/or relevance component 380 of FIG. 3B.

Relevance component 350 can determine, based on commands or command representations received by a digital assistant device 210, a likelihood that a particular command template corresponds to the received command or command representation. While a variety of relevance determining methods may be employed, a machine learning application may be considered, though a ranking of determined most similar command templates to a command or command representation received from a digital assistant device 210 can also facilitate a determination of relevant one or more most relevant command templates. Determined most-relevant command templates can thereby facilitate the selection of one or more most relevant action datasets to be distributed to the command-sending digital assistant device 210.

Various embodiments of relevance component 350 are discussed throughout. Some embodiments of a relevance component 350 are discussed in conjunction with relevance component 380 of FIG. 3B process 500 of FIG. 5, and process 600 of FIG. 6. That is, the relevance component 350 may include any of the components, modules, operations, functionalities, features, and/or steps discussed in conjunction with relevance component 380, process 500, and/or process 600. In particular, any of components, modules, operations, functionalities, features, and/or steps discussed in conjunction with relevance component 350, relevance component 380, process 500, and/or process 600 may be combined and/or implemented in a relevance component included in digital assistant server 310. In some embodiments, relevance component 350 can include and access a defined set of rules, employable by the relevance component 350 to assign scores to each search result, indicating its relative priority. These scores can be included in a "modifier" of a corresponding search result (e.g., a relevant action dataset), which enables the relevance component 350 to update the ranking (e.g., up-boost or down-boost) of a relevant (or candidate) action dataset with respect to other relevant action datasets included in the plurality of search results.

One exemplary first rule that can be employed by relevance component 350 can enable relevance component 350 to determine whether the received command or command representation includes a direct reference to a particular application name By way of example, a command representation can include "play song in Spotify," where the term "Spotify" can be determined as a direct reference (e.g., strong mention) to the Spotify application. A command template can have corresponding keywords "play song in" followed by a parameter field <application name>. The parameter "Spotify" can be employed as a search query to determine whether the application name corresponds to one of a plurality of existing application names The application name can be searched from a variety of resources, such as an application marketplace database, a list of applications known to be installed on the requesting digital assistant device 210, or a list of applications stored and/or supported by the digital assistant server 310, or a list of applications stored by the digital assistant server 310. Thus, by way of example, if the keywords or phrase(s) of the command representation is determined to correspond directly to the keywords or phrase(s) of an existing command template, and the parameter (e.g., "Spotify") included in the parameter field (e.g., "<application name>") portion of the command representation is determined to correspond to a term or phrase included in the plurality of parameters in the database of defined application names (e.g., "application names"), the relevance component 350 can determine that the rule is satisfied and assign a corresponding score to the search result or the modifier of the action dataset associated with the command template.

Another exemplary second rule that can be employed by relevance component 350 can enable relevance component 350 to determine whether the received command or command representation directly corresponds to (e.g., matches) a dictionary-based template. A dictionary-based template can correspond to a command template stored by the digital assistant server 310. The dictionary-based template, however, can reference a dictionary of known parameters that correspond to a defined parameter field included in the dictionary-based template. By way of example, a command representation can include the phrase "play U2." The term "U2" can be one of a plurality of parameters in a database of defined music groups or artists, such as one titled "music artists." In this regard, the dictionary-based template may include the keyword "play," followed by the parameter field "<music artist>". Thus, by way of example, if the relevance component 350 can determine that the parameter (e.g., "U2") included in the parameter field (e.g., "<music artist>") corresponds to a term or phrase included in the plurality of parameters in the database of defined music groups or artists (e.g., "music artists"), the relevance component 350 can determine that the rule is satisfied and assign a corresponding score to the search result or the modifier of the action dataset associated with the command template.

Another exemplary third rule that can be employed by relevance component 350 can enable relevance component 350 to determine whether the received command or command representation only partially corresponds to (e.g., has a weak mention) of a particular application. By way of example, a command representation can include "play Spotify songs," where the term "Spotify" can be determined as a direct (e.g., strong) reference to the Spotify application. Unlike the strong mention rule, a search for a corresponding command template may determine that a direct match of the keywords or phrases preceding the parameter in the command representation does not exist, or in other words, that only a portion of the command representation corresponds to a stored command template (e.g., "weak mention"). Similar to the strong mention rule, the relevance component 350 can employ parameter "Spotify" as a search query to determine whether the application name corresponds to one of a plurality of existing application names Thus, by way of example, if relevance component 350 determines that the parameter (e.g., "Spotify") included in the parameter field (e.g., "<application name>") corresponds to a term or phrase included in the plurality of parameters in the database of defined application names (e.g., "application names"), the relevance component 350 can determine that the rule is satisfied and can assign a corresponding score to the search result or the modifier of the action dataset associated with the command template.

Another exemplary fourth rule that can be employed by relevance component 350 can enable relevance component 350 to determine whether the received command or command representation corresponds to a plurality of command templates. By way of example, a command representation can include "message Bob where are you?," where the term "Bob" can be determined as a direct (e.g., strong) reference to a contact in a contact list of the requesting digital assistant device. A search for a corresponding command template may determine that a direct match of the keywords or phrases and the parameter in the command representation corresponds to at least two command templates, such as "message <username>" and "message <username> <message>". The relevance component 350 can employ parameter "Bob" as a search query to determine whether the recipient's name corresponds to one of a plurality of contacts in a contact list associated with the digital assistant device. Thus, by way of example, if relevance component 350 determines that the keywords or phrases "message" corresponds to more than one command template, that a first parameter corresponds to each of those command templates, but that one particular command template includes an additional parameter field that can correspond to the remaining parameters of the received command representation (e.g., corresponding to the <message>parameter field), the relevance component 350 can determine that the rule is satisfied and can assign a corresponding score to the search result or the modifier of the action dataset associated with the command template having the greater number of parameter fields (e.g., "message <username><message>").

Another exemplary fifth rule that can be employed by relevance component 350 can enable relevance component 350 to determine whether the received command or command representation includes keywords or phrases that correspond to parameter field(s) of a command template, but that the remaining keywords or phrases do not directly correspond to the keywords or phrases of the command template. By way of example, a command representation can include "show me my tickets to U2," where the terms "show," and "tickets," can be determined to correspond to the command template "show tickets to <artist name>" and the parameter "U2" can be determined to correspond to the <artist name> parameter field. Here, the remaining terms "me," "my," and "to," are extraneous terms that are determined not to have a direct correspondence to the command template "show tickets to <artist name>." Thus, by way of example, if relevance component 350 determines that the command representation does not exactly match a command template, but that all parameters of the command template can be matched to one or more portions of the command representation, the relevance component 350 can determine that the rule is satisfied and can assign a corresponding score to the search result or the modifier of the action dataset associated with the command template determined to have the parameter fields matching each parameter of the command representation.

Another exemplary sixth rule that can be employed by relevance component 350 can enable relevance component 350 to determine whether the received command or command representation includes keywords or phrases that correspond to keywords or phrases of a command template, but that the remaining keywords or phrases do not directly correspond to the parameter fields of the command template, or in other words, a search of keywords or phrases in the parameter field portion(s) of the command representation indicates that the keywords or phrases do not match any parameters in a plurality of known parameters. By way of example, a command representation can include the phrase "play the trumpet show." A command template may include the keyword "play," followed by any parameter field, such as "<music artist>", "<movie title>", "<song name>", "<show title>", "<genre name>", and the like. Thus, by way of example, the relevance component 350 can determine that the term "play" from the command representation directly correspond to a command template in accordance with any of the foregoing examples, yet the relevance component 350 also determines that the parameter (e.g., "the trumpet show") included in the parameter field does not match or correspond to any parameter included in any plurality of parameters in the database of defined parameter types associated with the parameter field. In this regard, the relevance component 350 can determine that the rule is satisfied and assign a negative corresponding score to the search result or the modifier of the action dataset associated with the command template, thereby suppressing the action dataset associated with the command template.

Another exemplary seventh rule that can be employed by relevance component 350 can enable relevance component 350 to determine whether the received command or command representation directly corresponds to (e.g., matches) a wildcard template. A wildcard template can correspond to a command template stored by the digital assistant server 310. The wildcard template, however, can include a parameter field that can generally accept any keyword or phrase included in the command representation. By way of example, a command representation can include the phrase "text Bob how are you?" A search for a corresponding command template may determine that a direct match of the keywords or phrases and the parameter in the command representation corresponds to at least a wildcard template, such as "text <message>". Thus, by way of example, if relevance component 350 determines that the keyword or phrase "text" corresponds to a keyword or phrase of at least a wildcard template, and that the parameter field "<message>" of the wildcard template can correspond to any other keywords or phrases (e.g., "Bob how are you?") included in the command representation, the relevance component 350 can determine that the rule is satisfied and assign a corresponding score to the search result or the modifier of the action dataset associated with the wildcard template. In some embodiments, the relevance component 350 can assign specific values, whether whole numbers or decimal values (e.g., 0.1, 0.01, 0.001, 0.0001, etc.) depending on implementation, to a modifier of an action dataset (e.g., search result) included in a plurality of potential action datasets identified based on a received command or command representation. Such values can be assigned to the modifier in a specific order, based on how each action dataset is to be boosted and/or ranked in accordance with a desired priority. By way of non-limiting example only, the following scores can be employed as modifiers based on a satisfaction of each the first through seventh rules described herein above. For the first exemplary rule, a score of 0.1 can be assigned or appended to the modifier. For the second exemplary rule, a score of 0.01 can be assigned or appended to the modifier. For the third exemplary rule, a score of 0.001 can be assigned or appended to the modifier. In some aspects, the score for the third exemplary rule can be assigned or appended to the modifier if a score already assigned to the application dataset, by the search engine, is greater than a predefined percentage (e.g., 20% to 40%) of a score already assigned or appended to a modifier (e.g., by the search engine) of a determined highest scored action dataset. For the fourth exemplary rule, a score of 0.0001 can be assigned or appended to the modifier of the action dataset associated with the command template determined to have the greatest number of parameters. Also, for the fourth exemplary rule, a score of 0.0005 can be assigned or appended to the modifier of the action dataset associated with the command template determined to not to have the greatest number of parameters. In some embodiments, for the fourth exemplary rule, a distribution of different scores less than 0.0001 can be assigned or appended to the modifier of each action dataset associated with the command template determined to not to have the greatest number of parameters, which may vary depending on a number of action datasets determined to not to have the greatest number of parameters. For the fifth exemplary rule, a score of 0.0001 can be assigned or appended to the modifier. In some aspects, the score for the fifth exemplary rule can be assigned or appended to the modifier if a score already assigned to the application dataset, by the search engine, is greater than a predefined percentage (e.g., 20%) of a score already assigned or appended to a modifier (e.g., by the search engine) of a determined highest scored action dataset. For the sixth exemplary rule, a score of 0.0000001 can be assigned or appended to the modifier. For the seventh exemplary rule, a score of 0.000001 can be assigned or appended to the modifier. As the foregoing scores are merely exemplary, it is contemplated that any value or scores can be defined for assignment or appendage to a modifier of an action dataset, and that each value or score can be changed based on a desired relevance determination made by the digital assistant server 310 described in accordance with the present disclosure. In various embodiments, each score for a particular rule can be remain relative in value to the scores of other rules, or relative values can be modified based on the desired relevance determination made by the digital assistant server 310.

The distribution component 360 can distribute or communicate to one or more digital assistant devices 210, determined relevant or most relevant action datasets, determined new action datasets, determined updated action datasets, any portion and/or combination of the foregoing, or generated notifications corresponding to any portion and/or combination of the foregoing, among other things, based on a variety of factors. For instance, the distribution component 360 can include features that determine, among other things, which applications are installed on a digital assistant device 210. Such features can enable the digital assistant server 310 to determine which action datasets or portions thereof are relevant to the digital assistant device 210, and should be distributed to the digital assistant device 210. For instance, a digital assistant device 210 profile (not shown) describing all applications currently installed or executable by a digital assistant device 210, can be maintained (e.g., stored, updated) by the digital assistant server 310. The profile can be updated periodically, manually, or dynamically by a server interfacing component 260 of the digital assistant device 210 (e.g., whenever the digital assistant is in communication with and sends a command to the digital assistant server 310, or whenever an application is installed or updated on the digital assistant device 210). The distribution component 360 can distribute or communicate notifications, action datasets, or portions thereof, in a variety of ways, such as pushing, sending in response to received requests for updates, sending in response to established communications with a digital assistant device 210, or by automatic wide scale (e.g., all digital assistant devices) or selective scale (e.g., region, location, app type, app name, app version) distribution, among other things.

Looking now to FIG. 3B, a block diagram 300 of an exemplary relevance component 380 that may be included in the digital assistant server 310 for use in implementing embodiments of the invention is shown. As shown in FIG. 3B, relevance component 380 may include one or more of a parameter slotter 382, a feature generator 384, an action ranker 386, and an action segmenter 388. In addition to the components, modules, operations, functionalities, features, and/or steps discussed in conjunction with FIG. 3B, relevance component 380 may include any of the components, modules, operations, functionalities, features, embodiments, implementations, and/or steps discussed in conjunction with relevance component 350 of FIG. 3A, process 500 of FIG. 5, and/or process 600 of FIG. 6. More particularly, any of the components, modules, operations, functionalities, features, embodiments, implementations, and/or steps discussed in conjunction with relevance component 350, relevance component 380, process 500, and/or process 600 may be combined and/or included in relevance component 380, as well as implemented in digital assistant server 310 of FIG. 3A.

Similar to relevance component 350, relevance component 380 can determine, based on commands or command representations received by a digital assistant device 210, a likelihood that a particular command template corresponds to the received command or command representation. More particularly, searching component 345 of FIG. 3A may provide relevance component 380 search results that include a set of relevant (or candidate) action datasets, where each action dataset included in the set is relevant to the received command. Accordingly, each action dataset included in the set may be a candidate action dataset. Various embodiments of actions datasets are discussed throughout, including but not limited to action dataset 410 of FIG. 4. The set of relevant action dataset may be ranked based on a primary of initial score generated by the searching component 345.

As noted above, each relevant action dataset of the set of relevant action datasets may include and/or be associated with one or more command templates. Each command template for an action dataset may include one or more parameter (or parameter types). The parameters of the command template may include fields, terms, values or the like. Various embodiments of command templates are discussed throughout, including but not limited to at least in conjunction with command templates 440 of FIG. 4. Parameter slotter 382 is generally responsible for analyzing the received command and determining and/or identifying parameters (e.g., parameter values) to "slot" into the various parameters (e.g., parameter types and/or parameter fields) of each command template of each relevant action dataset of the set of relevant action datasets. That is, parameter slotter 382 matches, associates, and/or generates a correspondence or correlation with parameter values to the parameters of the command templates based on the received command, the context of the command and/or the user's sessions, as well as other contextual information.

Based on the slotted or matched parameters of the command templates, feature generator 384 is primarily responsible for generating features for each of the relevant action datasets of the set of relevant action datasets. For example, feature generator 384 may analyze the slotted parameters, as well as the received command, relevant action datasets, and command templates to determine boosting (e.g., up-boosting and down-boosting) features for each relevant action dataset. Some of these action features may include a level of "completeness" for each clotted command template, whether an associated application is installed on, or otherwise available to, the user's computing device (e.g., digital assistant device 210 of FIG. 2), whether the application's name or the user's intent may be strongly (or weakly) inferred from the command, and the like. The analysis of the parameters and/or boosting features may be a multi-dimensional analysis. The action ranker 386 is generally responsible for generating a secondary score for each of the relevant action datasets of the set of relevant action datasets based on the generated action features (e.g., the boosting features). This secondary score may be used to update and/or modify the rankings of the relevant actions in the set of relevant action datasets. The action segmenter 388 is generally responsible for segmenting the relevant action datasets by categorizing and/or classifying each of the relevant action datasets via one or more action dataset types. Relevance component 380 may provide one or more of the relevant action datasets, including the matched parameters and action category, to the user's computing device (e.g., a client computing device).

More specifically, parameter slotter 382 may perform an initial "slotting" or matching as many parameters to each command template of each relevant action dataset of the set of relevant action datasets as possible, based on an analysis of the received command, as well as contextual information regarding the command, the user's session, and other factors. Thus, parameter slotter 382 may generate an initial mapping of parameter values to parameters (or parameter fields) for various relevant action datasets (and associated command templates). To perform the initial matching, parameter slotter 382 may consult various dictionaries, databases, and other sources of information. These dictionaries, databases, and other informational sources may be referred to as "entities." The entities may include various rules, heuristics, look-up tables, schedules, menus, options, maps, correspondences, and the like. Parameter slotter 382 may inspect (or analyze) the command to employ the rules or heuristics. The collection of rules, heuristics, and information available via such entities, accessible by parameter slotter 382, may be referred to as "deep knowledge." By way of non-limiting examples, such deep knowledge may include information as to the content available via one or more streaming sources, which are accessible via one or more action datasets of one or more applications, e.g., Netflix, Hulu, Amazon Video, Apple Video, HBO, Vimeo, Spotify, Amazon Music, Apple Music, Napster, YouTube, and the like. Such information may include schedules for various modes of public transit (e.g., bus schedules, train schedules, ferry schedules, and the like), as well as airline travel schedules and the like. Entities may include restaurant menus, television and movie timetables and listings. Any information included in the entities may be available, as parameters, to slot into and/or match with the parameter fields or parameter types of each command template of each relevant action dataset.

The entities may include a user's profile, social network application, calendar applications, scheduling applications and the likes. Deep knowledge may include the user's preferences, social networks, social network and news feeds, the user's schedule, as well as the schedules of others, and the like. As discussed throughout, parameter slotter 382 may employ various machine learning (ML) and/or artificial intelligence (AI) methods to "learn," develop, generate, and/or determine such deep knowledge from the entities. Parameter slotter 382 may analyze the received command, via various natural language processing (NLP) methods to determine keywords, phrases, mentions, intentions, contexts, and the like, any of which may be slotted into parameters of the command templates, and/or employed to infer, determine, or otherwise identify parameter values to slot (or match) into the command templates. Deep knowledge, including the rules and/or heuristics included in the various entities, may be employed to slot the parameter values into the parameters of the command templates.

For example, the received command may include "play star wars." Parameter slotter 382 may access, or otherwise consult, the entities to determine that the keywords "star wars" may be associated with multiple movies, as well as multiple television shows, books, and soundtrack albums. Based on this deep knowledge, parameter slotter 382 may slot "star wars" as either one or more movies, one or more television shows, books, and one or more albums into the parameter fields of various command templates associated with various action datasets associated with various movie, television, audio book, and music streaming services. In some embodiments, parameter slotter 382 may slot or match more than one parameter value with a single parameter field of a command template. For instance, in the above "star wars" example, parameter slotter 382 may slot both "Star Wars: A New Hope," and "Star Wars: The Empire Strikes Back," into the same parameter field for multiple command templates that are associated with movie titles for an action dataset associated with a movie streaming application (e.g., HBO, Amazon, and Hulu).

Parameter slotter 382 may employ ML and/or AI methods to infer parameter values to slot into the command templates as discussed throughout. For example, parameter slotter 382 may implement various supervised or unsupervised ML methods to train one or more ML models to "learn" and/or infer knowledge from the entities and/or from the received command In additional to the rules and heuristics included in the entities, parameter slotter 382 may employ such learned or inferred deep knowledge to perform the initial slotting or matching of the parameters into the various command templates.

As a non-limiting example, parameter slotter 382 may employ any of the rules discussed in conjunction with relevance component 350 of FIG. 3A to slot or match parameters to the relevant action datasets via the command templates. For example, parameter slotter 382 may employ a rule that enables parameter slotter 382 to determine whether the received command or command representation corresponds to a plurality of command templates. Parameter slotter 382 may employ another rule that enables parameter slotter 382 to determine whether the received command or command representation includes keywords or phrases that correspond to parameter field(s) of a command template, but that the remaining keywords or phrases do not directly correspond to the keywords or phrases of the command template. Parameter slotter 382 may employ still another rule that enables parameter slotter 382 to determine whether the received command or command representation includes keywords or phrases that correspond to keywords or phrases of a command template, but that the remaining keywords or phrases do not directly correspond to the parameter fields of the command template, or in other words, a search of keywords or phrases in the parameter field portion(s) of the command representation indicates that the keywords or phrases do not match any parameters in a plurality of known parameters. Parameter slotter 382 may employ still another rule that enables parameter slotter 382 to determine whether the received command or command representation directly corresponds to (e.g., matches) a wildcard template.

Parameter slotter 382 may consult and/or refer to any dictionary, database, or other information source (e.g., an entity) in the application and/or implementation of such rules. For example, the received command may include the phrase, "play Narcos." Parameter slotter 382 may have access to an entity (e.g., one or more databases) that indicates which particular content (e.g., television shows) are available through which video streaming applications. Parameter slotter 382 may consult these one or more databases to determine that "Narcos" is a television show available only through a "Netflix" application, i.e., Narcos is not available through other available and/or relevant video streaming applications, such as but not limited to an Amazon application of a Hulu application. In such embodiments, parameter slotter 382 may match (or slot) the parameter "Narcos" to a particular parameter field of a command template of a relevant action dataset associated with the Netflix streaming application.

As noted above, in addition to consulting entities, parameter slotter 382 may generate, aggregate, and/or "learn" deep knowledge via ML and/or AI methods. Parameter slotter 382 may consult such entities to learn, or at least look-up, restaurant names, restaurant menus, flight numbers, movie names, names of television shows, musical groups, albums, or any other such information. In another non-limiting example, the command may include "tell me about my upcoming flight to Seattle." Parameter slotter 382 may employ various ML and/or AI methods, and/or coordinate with other applications, to "learn" or determine that the user has previously booked a flight from San Francisco to Seattle, via United Airlines, scheduled for next Thursday. Via ML and/or AI methods, parameter slotter 382 may identify and/or determine an airline (e.g., United Airlines), a date (e.g., the date corresponding to next Thurday), a time of day (e.g., a timestamp such as 13:35 PST), and a corresponding flight number (e.g., UA flight number 123). Parameter slotter 382 may treat one or more of these identified values as parameters, and slot or match these parameter values (United Airlines, next Thursday, 13:35 PST, and UA flight number 123) as parameters into one or more command templates associated with a calendar application or an application associated with United Airlines. Based on the context of the command, features of the user (e.g., user residence, user's current location, user's habits, likes, interests, and the likes), parameter slotter 382 may infer additional parameters to slot command templates, such as but not limited departure and arrival locations (e.g., San Francisco International Airport and Seattle International Airport, respectively). To slot or match the parameters, parameter slotter 382 may consult one or more entities, such as but not limited to a user profile, a calendar application associated with the user, a social network and/or feed of the user, a messaging service, and email application, or any other such user associated reference or resource.

In another non-limiting embodiment, the received command may include "create an event at 2 PM." Parameter slotter 382 may infer to slot, within a command template of a relevant action dataset associated with a calendar application, the value of today's date into a parameter corresponding date parameter field and the timestamp value of 2 PM into a parameter corresponding start time field. Parameter slotter 382 may infer a timezone associated with the user, based on a geolocation of the user. For example, parameter slotter 382 may consult a location-services device or module (e.g., a GPS receiver) included in the user's computing device to determine a current location of the user. If the user is currently located in Seattle, parameter slotter 382 may update the parameter value slotted in the start time parameter to be 2 PM PST. In still another example, the received command may include "create a weekly recurring event." In such scenarios, parameter slotter 382 slot additional parameters fields, such that an execution of the relevant action dataset with the slotted command template would result in creating a weekly recurring event in the user's calendar application.

Some relevant action dataset and/or associated command template may have no parameter slots to slot or match parameter or parameter values into. In such cases, parameter slotter 382 may pass over, or not attempt, slotting parameters values into the relevant action dataset or associated one or more command templates.

Prior to slotting thee parameters, parameter slotter 382 may perform various cosmetic operations on the representation of the command and/or keywords and phrases included in the representation of command In some embodiments, when performing such parameter cosmetics, parameter slotter 382 may enforce various normalizations or standards on each word, token, or phrase included in a command, such as but not limited to enforcing lower case values on all alphanumeric characters included in the tokens of the command. Such parameter cosmetics may enhance the likelihood of making a successful or at least likely successful parameter match. For example, the representation of the command may include "Play Star Wars." Parameter slotter 382 may transform the representation of the command to be "play star wars," which may make the performance of parameter slotting more successful. Parameter slotter 382 may remove various punctuation or other special characters from the representation of the command.

Some of the slotted parameters may be session parameters. Session parameters may be parameters or parameter values that are associated with a current session, or a previous session, of the user. The values for session parameters may be determined, identified, or inferred based on one or more other parameters associated with previous commands of the current session, or one or more previous sessions. That is, one or more session parameters may be slotted based on the context of one or more user sessions and/or one or more other commands associated with the one or more user sessions. For example, in a particular user session, the command "navigate me to Seattle," may be received. Such a command may invoke a navigation application, such as Google maps, with the parameter value "Seattle," slotted into a parameter type destination. The next command received may be a question, such as but not limited to "What is the weather there." In such embodiments, via ML and/or AI methods, parameter slotter 382 may infer that the keyword "there" refers to the destination of the previous command, i.e., "Seattle." Parameter slotter 382 slot the parameter value "Seattle," into a parameter for a command template associated with a weather application.

When slotting parameters, parameter slotter 382 may assign a score or a likelihood to each slotted parameter value that indicates a probability or likelihood that the slotted parameter value is correct for the parameter type of the command template. When finished with the initial pass, parameter slotter 382 may select a final parameter for each parameter field of each command template, based on the likelihood score of the initial parameter slotting. In some embodiments, the final parameter may be based on one or more rules or heuristics, e.g., a parameter selection rule. In a non-limiting embodiment, for a received command including "take me to the San Jose airport." During the initial parameter slotting pass, parameter slotter 382 may slot both parameter values "San Jose" (referring to the city of San Jose and "San Jose International Airport" (referring to the international airport located within the city of San Jose) for a mapping application, e.g., Google Maps. Parameter slotter 382 may employ a parameter selection rule that indicates that when more than one parameter value has been slotted into a single parameter, then the longer parameter value or the most specific parameter value is selected, i.e., parameter slotter 382 would select the parameter value "San Jose International Airport," for the destination parameter field in the command template for an action dataset associated with the Google Maps application. In various embodiments, such parameter selection rules may be referred to parameter decision rules.

Feature generator 384 generates features for each relevant action dataset of the set of relevant action datasets, based on the parameters slotted in the associated command templates. The features for a particular relevant action dataset of the set of relevant action datasets may be employed to differentiate the particular relevant action dataset from the other relevant action datasets of the set of relevant action datasets. At least some of the action features may be flags, tags, or variables (e.g., Boolean, integer, float, or other variable types) that indicate characteristics of the various relevant action datasets. At least some of the action features may be boosting features. As discussed in the context of at least action ranker 386, boosting rules may be employed to (up or down) boost the rankings of the set of relevant action datasets. The boosting rules may be rules that indicate how the rankings of each of the relevant action datasets should be updated based on the action features, which are in turn based on the slotted parameters. That is, the boosting features may be employed to determine which of the relevant action datasets are selected to provide to a client device (e.g., digital assistant 210) and which of the relevant action datasets are not provided to the client device. Or more succinctly, at least some of the relevant action datasets may be removed, filtered, or vetoed from the set of relevant action datasets based on some of the action features.

In some non-limiting embodiments, the features may be based on at least, but not limited to, the slotted parameters. In these and other embodiments, the features may be based on additional and/or alternative criteria and/or considerations. In one such embodiment, a feature may be based on where the action occurs and/or amongst, relative to one or more other actions and/or commands For example, generating the features may be based on a set of commands and/or actions (e.g., one or more previous commands and/or executed and/or recommended actions). The generated features may be based on the sequence or order of the set of commands and/or actions. Generating the features may be based on the context of one or more of the commands and/or actions in the set.

Some of the features may be specific or intrinsic of the action, while other features may be based on the context of the search for the relevant action datasets. The features may include the number of slotted parameter values, a score for each slotted parameter indicating a likelihood of successful matching of the parameter, or an indication of whether the parameter matching for a particular command template is complete or incomplete. Some of the features may include an indication of whether the command includes a strong or a weak mention of the application associated with the action dataset, a strong or weak mention of one or more slotted parameters, a strong or weak mention of a verb associated with the action dataset, a strong or weak determination of the user's intent of the command, and the like. For instance, if the received command include "tweet my location," the user's intent may be strongly inferred, via rules, heuristics, or AI methods, to invoke an application associated with Twitter, to generate a tweet that includes a geolocation of the user's device. Some of the features may include an indication of whether the associated application is installed on the user's device. Some of the features for an action dataset may indicate the initial and/or primary score of the relevant action dataset, which was generated by searching component 345. At least one of the features for an action dataset may indicate the initial ranking of the relevant action dataset within the set of relevant action datasets. Some of the boosting features may indicate whether requested content is available from a streaming service associated with the application that maps to the action dataset.

The boosting rules may include a multi-dimensional analysis of the determined features. For example, some of the features for a relevant action may be up-boosting features (e.g., a strong application mention and a complete slotting of the parameters for a command template), while other features may be down-boosting features (e.g., the application is not installed on the user's device, a low score that the parameter slotting is consistent with the user's intent, or the requested content is not available from the associated application.). The overall boosting of an action dataset may be based on considering each of, or at least a portion of, the determined features. The boosting rules may include any of the various ranking rules discussed throughout.

Action ranker 386 is generally responsible for generating a second, or secondary, score for each relevant action dataset. The second score may be based on any of generated features for the relevant action dataset, including but not limited to the up and down boosting features. The secondary score may be based on the up and down boosting features for the action dataset. The secondary score may be based on any of the boosting rules and/or heuristics discussed throughout. For example, the secondary score may be determined based on any of the rules discussed in conjunction with relevance component 350 of FIG. 3A and/or the rules discussed in conjunction block 560 of FIG. 5. In some embodiments, the secondary score may be a score that is updated based on the initial and/or preliminary score for the action dataset. Action ranker 386 may update the ranking of the relevant action datasets based on the secondary score. Action ranker 386 may rank the set of relevant action datasets based on any of the embodiments discussed throughout. For example, the ranking of the relevant action datasets may be determined based on any of the ranking rules discussed in conjunction with relevance component 350 and/or the rules discussed in conjunction block 570.

In at least one embodiment, action ranker 386 may combine the primary and secondary scores for the relevant action datasets to generate a final score for the relevant action datasets. That is, action ranker 386 may generate and/or determine a final score for each candidate action dataset of the set of candidate action datasets, wherein the final score for a particular candidate relevant action dataset is based on a combination of the primary (or initial) score and the secondary score for the particular candidate relevant action dataset. The combination may be a linear or non-linear combination of the scores. The combination may be a weighted combination. Because at least the secondary score is based on the features for an action dataset, the final score for the candidate relevant action dataset may be based on the features generated for the candidate relevant action dataset. In some embodiments, action ranker 386 may update the ranking of the set of candidate relevant action datasets based on the final scores for the candidate relevant actions datasets.

Action segmenter 388 is generally responsible for segmenting the relevant action datasets into one or more segments, by classifying and/or labeling the relevant action datasets into one or more categories. The segmentation of the relevant action datasets may be based on the features for the action datasets, the various scores (e.g., the primary, secondary, or final scores), the ranking of the action datasets, the various parameters values selected (or slotted) for the action datasets, various features or attributes of the command (or command representation) that the candidate relevant actions datasets are based on, and the like. After segmenting the set of candidate relevant action datasets, via classifying and/or categorizing the candidate relevant action datasets, action segmenter 388 may provide the ranked and categorized set of candidate relevant action datasets to a distribution component, such as but not limited to distribution component 360 of FIG. 3A. As discussed throughout, distribution component may provide a digital assistant device, such as but not limited to digital assistant device 210 of FIG. 2, one or more of the candidate relevant action datasets, with the selected or matched parameters, for execution, based on at least one of the categorization, scores, ranking, features, and/or matched parameter values of the candidate relevant action datasets.

The possible or potential categories or classifications of the candidate relevant action datasets may include one or more of the flowing: main, related, recommended, promoted, incomplete, informational, federation, and contextual. Prior to providing the categorized relevant action datasets to the distribution component 360 and/or the digital assistant device 210, one or more of the candidate relevant action datasets may be vetoed, removed, and/or filtered from the set based on the category assigned to the candidate relevant action dataset. A interface of the digital assistant device 210, such as but not limited to server interfacing component 260, may handle, process, analyze, and/or execute the provided relevant action dataset based on the selected parameter values and/or the categorization of the relevant action dataset.

As noted throughout, one or more candidate relevant action datasets may be provided based on the scores and/or rankings, as well as the categorizations, of the candidate relevant action datasets. In at least one embodiment, only the highest ranked (or highest score) action dataset is provided. In other embodiments, a threshold test is applied to the final scores of the candidate relevant action datasets. In still other embodiments, a percentage of the top ranked (or highest scored) candidate relevant action datasets are provided.

Candidate relevant action datasets that are classified as main action datasets may include candidate relevant action datasets that have passed a score and/or ranking threshold test and are to be provided for execution. In at least some embodiments, only candidate relevant action datasets that have each and every parameter field of its associated command template matched to a likely parameter value are categorized as a main action dataset. That is, in these embodiments, a main action dataset is a complete (i.e., not an incomplete) action dataset. In some embodiments, multiple action datasets may be classified as a main action dataset. In other embodiments, only one candidate relevant action datasets of the set may be classified as the main action dataset. Thus, in some embodiments, the main action dataset is the highest ranked complete candidate relevant action dataset. Because an incomplete action dataset may be the highest ranked action dataset, the main action dataset need not be the highest ranked candidate relevant action dataset. Because the main action dataset is a complete dataset (i.e., a main action dataset has parameter values selected for each of its parameter fields), the digital assistant device may execute the main action dataset. Thus, action segmenter 388 may classify one or more of the higher ranked (but not necessarily the highest ranked) complete candidate relevant action datasets as the main action dataset.

Candidate relevant action datasets that are classified as related action datasets may include relevant action datasets that are related to the main action dataset. For example, if the main action dataset is an action dataset that, when executed, plays, via the Spotify application, a particular song from a particular band, a related action dataset may include an action dataset, that when executed, plays, via the Spotify application, the next song from the particular band. In some embodiments, action segmenter 388 may generated action datasets that are related to the main action dataset. That is, action segmenter 388 may generate action datasets that are not included in the set of candidate relevant action datasets, but are related to the main action dataset. The action segmenter 388 may provide these related action datasets to the client device (e.g., the digital assistant device).

Candidate relevant action datasets that are classified as promoted action datasets may include relevant action datasets, where the corresponding application is not installed on the user's client device, e.g., digital assistant device 210. For example, if the command includes "play Narcos," and the Netflix application is not installed on the user's device, a candidate relevant action dataset corresponding to the Netlfix application may be classified as a promoted action dataset. In at least some embodiments, when the user's device receives a recommended action dataset, the user may be prompted to install the application that is associated with the recommended action dataset.

Candidate relevant action datasets that are classified as information action datasets may include relevant action datasets that is associated with a command that includes a request for information that is unknown or can't be obtained via the relevance component's 380 deep knowledge. For example, if the received command includes a question, such as but not limited to "who is the current president of the United States," of which the answer cannot be retrieved via the relevance component's 380 deep knowledge, each of the action dataset of the set of candidate relevant action datasets may be classified as an information action dataset. If the scenario where the received command includes a question that can't be answered, in some embodiments, no action dataset may be provided.

Candidate relevant action datasets that are classified as incomplete action datasets may include relevant action datasets that include missing parameter values. That is incomplete action datasets are those that include one or more parameter fields for which parameter values were not able to be slotted, matched, and/or selected. In contrast, complete action datasets are those candidate relevant action datasets for which at least one high confidence parameter value has been selected for each required parameter field of the command template.

Candidate relevant action datasets that are classified as contextual action datasets may include candidate relevant action datasets that are not currently directly related to intent of the command, but may be relevant to the command in the future (e.g., action datasets that may be relevant to subsequent commands that are related to the current command) That is, a contextual action dataset may be an action dataset that is related to the context of the current command, but may not be directly relevant to the current command For instance, a contextual action dataset may be a prediction of an action dataset that may be recommended to the user in regards to future commands For example, if the current command included "New York," a context action dataset may be include action that would invoke the functionality to return the current weather in New You City, because the "Weather in New York," may be contextually related to the current command "New York." In another example, a contextual action dataset may be in relation to advertising content that may be related to the context of the current command. For instance, another contextual action dataset for the command "New York," may be advertising content for lodging within New York City and/or an action dataset that enables the user to book lodging for New Your City, based on the context of the command "New York."

Candidate relevant action datasets that are classified as federation action datasets may include candidate relevant action datasets that are not currently published, are currently disabled, or otherwise not ready to go live yet. That is, federation action datasets are candidate relevant action datasets that are not available to the user. Thus, federation action datasets may be filtered from the set of candidate relevant action datasets. Candidate relevant action datasets that are classified as recommended action datasets may include candidate relevant action datasets that do not fit any other classification.

As noted above, one or more the candidate relevant action datasets may be provided to the client device (e.g., digital assistant device 210) based on the classification, categories, and/or labels assigned to the candidate relevant action datasets, as well as the rankings, final scores, and/or action features. In some embodiments, at least the main candidate relevant action dataset is provided to the client device. In some embodiments, one or more incomplete candidate action datasets may be provided to the client device. When an incomplete action dataset is provided, an interface of some client devices may be enabled to prompt the user for additional information to slot the missing one or more parameter values into the parameter fields and transform the incomplete action dataset into a complete action dataset. For example. The received command may include "play me a song by U2." A candidate relevant action dataset may include an action dataset associated with the Spotify application. The parameter value "U2" may be selected for the parameter field associated with artist name However, the parameter value for the parameter field associated with song title is missing. The client device may prompt the user with the request at least similar to "Which song by U2 would you like to hear." The user may respond with an available song, e.g., "Where the Streets Have No Name." Either the relevance component 380 and/or the client device may slot the received parameter value into the missing parameter field to complete the action dataset.

Figure 4:
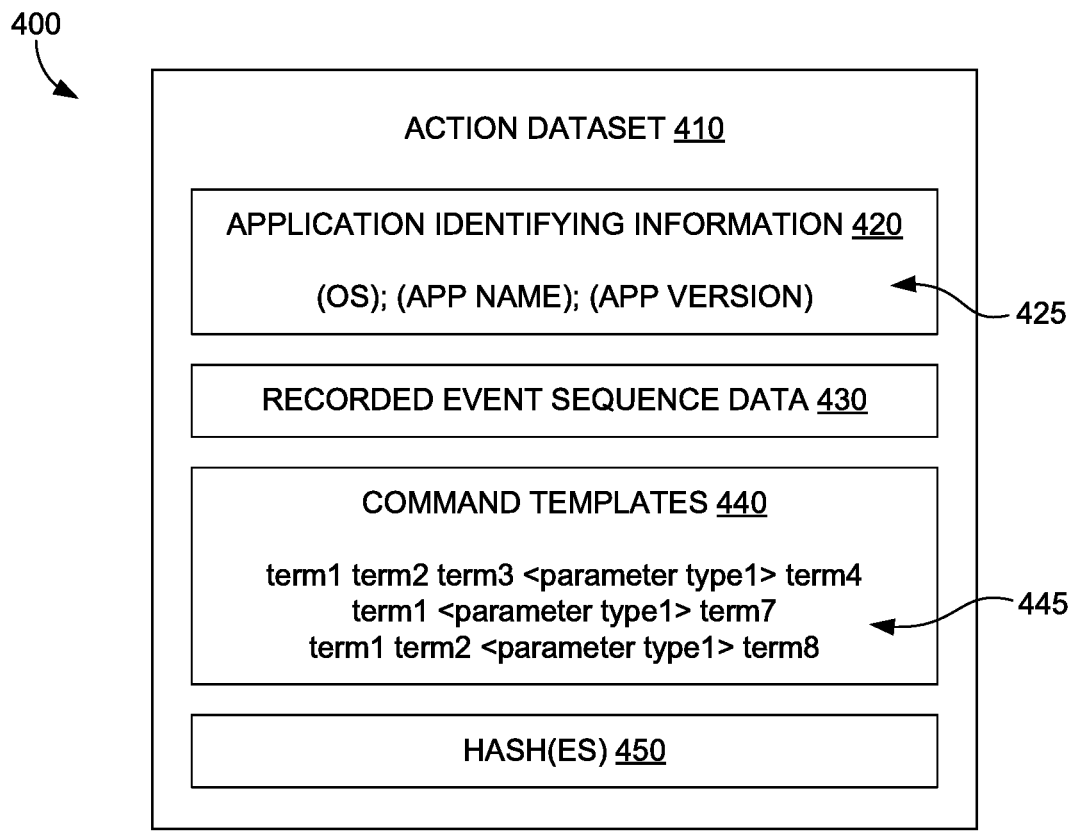
FIG. 4 is an exemplary data structure of an action dataset, in accordance with an embodiment of the present disclosure.

Turning now to FIG. 4, a data structure 400 of an exemplary action dataset 410 in accordance with some of the described embodiments is illustrated. The depicted data structure is not intended to be limiting in any way, and any configuration of the depicted data portions of information may be within the purview of the present disclosure. Further, additional data portions or less data portions may be included in an action dataset 410 also remaining within the purview of the present disclosure.

In the depicted data structure 400, the action dataset 410 includes application identifying information 420, recorded event sequence data 430, and command templates 440. In some embodiments, the action dataset 410 further includes hash(es) 450, which can include a hash value generated based on the entire action dataset 410, or hash values generated based on any portion of the aforementioned data portions 420, 430, 440, among other things. The action dataset 410 can be generated by training component 250 of digital assistant device 210 of FIG. 2 and/or received from distribution component 360 of digital assistant server 310 of FIG. 3A.

The application identifying information 420 can include information about a particular application that is required for execution to perform a particular operation for which the action dataset 410 was created. Exemplary pieces of application identifying information 420 are depicted in identifying information 425, which can include any one or more of an operating system (OS) name for which the particular application is executed on, an OS version of the aforementioned OS, a defined native language of the aforementioned OS, a name of the particular application, a version of the particular application, and the like. It is contemplated that the application identifying information 420 is required and checked (e.g., by the digital assistant server 310 of FIG. 3A), before an action dataset 410 is distributed to a digital assistant device (e.g., digital assistant device 210 of FIG. 2) and employed by the digital assistant device to ensure that the action dataset 410 is compatible with, or can be correctly interpreted by action executing component 240 of FIG. 2, so that the corresponding and desired operation is performed by the digital assistant device 210.

The recorded event sequence data 430 can include any or all task or event-related data that was obtained, received, or determined by the digital assistant device (e.g., via training component 250 of FIG. 2) responsible for generating the action dataset 410. As noted herein, the recorded event sequence data can include timing attributes of received inputs (e.g., delays before or in between successive inputs, duration of inputs, GUI elements interacted with, relative positions of GUI elements, labels or metadata of GUI elements, scroll inputs and distances, links or URLs accessed activated, detected activation of application deep links activated in response to received inputs, and more). In some instances, the recorded event sequence data 430 may include conditions that require actual user intervention before subsequent events or tasks are resumed. For instance, secured login screens may require that a user input username and password information before an application is executed. In this regard, the recorded event sequence data 430 may include a condition corresponding to when user authentication has occurred, and instructions (e.g., interpretable by action executing component 240) to proceed with the tasks or events in the recorded event sequence data 430 based upon an occurrence of the condition. In various implementations, it is contemplated that the action executing component 240 of FIG. 2 can parse metadata, GUI elements, or other information from an executing application to determine when certain events occur or conditions are met. In this regard, additional conditions may be included in the recorded event sequence data 430 that require prior events or tasks to be completed, or certain GUI elements be displayed or interacted with, or any other conditions to be met, before subsequent events or tasks are performed by the action executing component 240 of FIG. 2.

Figure 5:
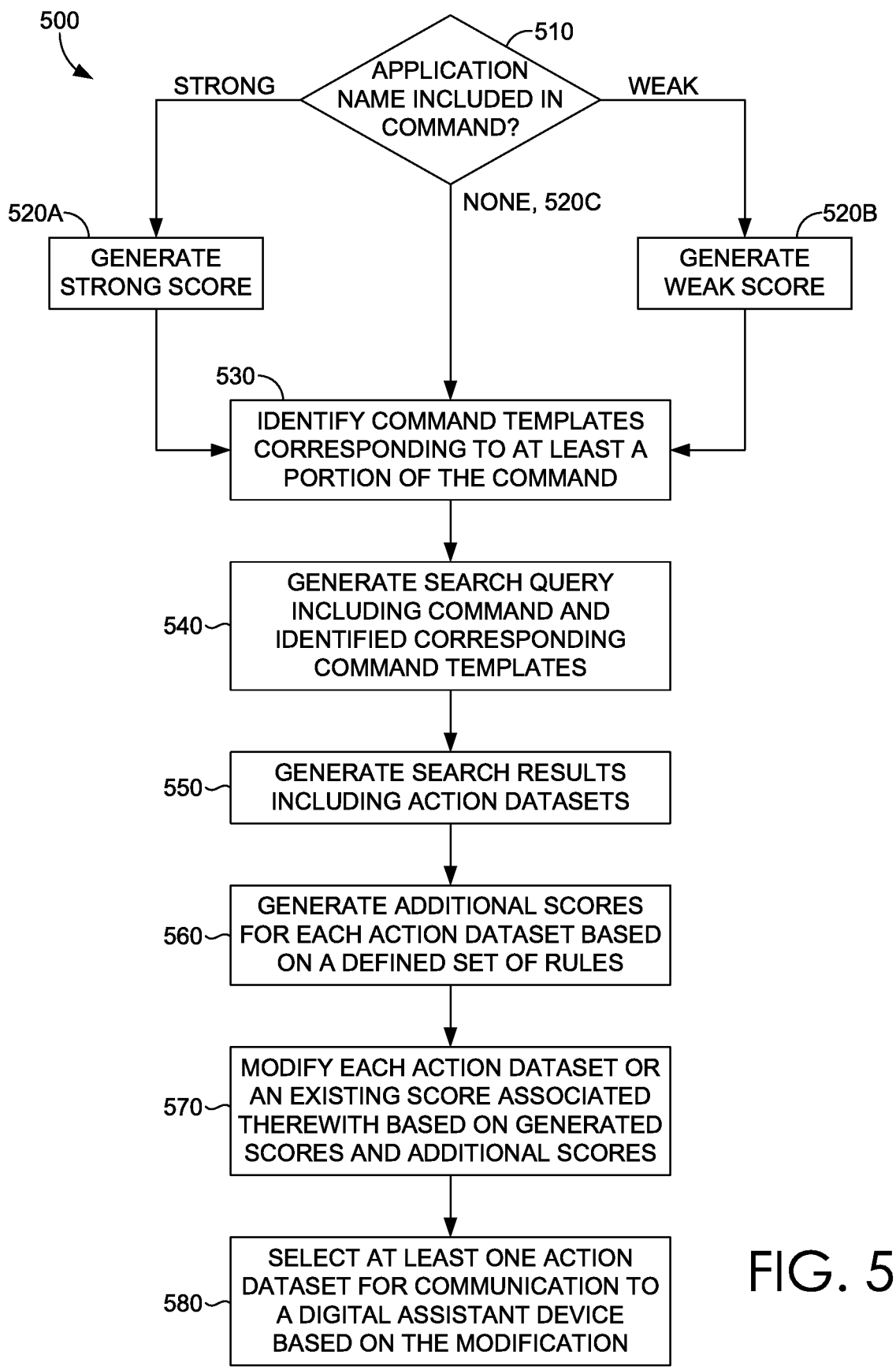
FIG. 5 is a flow diagram showing a method for determining, selecting, and communicating most-relevant actionable operations for distribution in a crowd-sourced digital assistant network, according to various embodiments of the present invention.

Turning now to FIG. 5, an embodiment of a process flow or method 500 for effectively determining and selecting most-relevant actionable operations (i.e., action datasets) for distribution in a crowd-sourced digital assistant network is described. As described herein, a server device, such as digital assistant server 310 of FIG. 3A, can receive a command or a command representation transmitted from a digital assistant device, such as digital assistant device 210 of FIG. 2. The command or command representation can include, among other things, an alphanumeric text representation of a spoken command that was obtained by the digital assistant device. To this end, the digital assistant device can either receive the alphanumeric text representation from another computing device, or employ a speech-to-text engine or $3^{rd}$-party service to convert the detected spoken command to alphanumeric text before it is communicated to the server device. After the command representation is received, the server device can employ a search engine, such as but not limited to searching component 345 of FIG. 3A, to search any number of databases, known or defined parameters, command templates, action datasets, dictionaries, or any other type of data or feature described in the present disclosure, at any time. The search engine can employ any one or more portions of a command representation, an action dataset, a command template, and the like, as queries to search any of the foregoing types of data or features. The search engine can generate a search result that includes any associated or at least partially associated types of data, which can also correspond to any of the foregoing types of data or features. For example, the search engine may generate a ranked set of relevant (or candidate) action datasets. In at least one embodiment, a relevance component, such as but not limited to relevance component 350 of FIG. 3A and/or relevance component 380 of FIG. 3B, may slot, match, identify, or otherwise determine one or more parameters for each of the relevant action datasets included in the ranked set of relevant action datasets, based on deep knowledge of the relevance action datasets, contextual information about a user's sessions, various rules and/or heuristics, one or more dictionaries or databases, as well as other information. The relevance component may define, identify, determine, generate, or otherwise create one or more features for each of the relevant action datasets based on the slotted parameters. The relevance component can define, redefine, or update the ranking of the set of relevant action datasets based on determining one or more additional scores and/or rankings of the set of relevant action datasets. Prior to providing a client device (e.g., a digital assistant device, such as but not limited to digital assistant device 210 of FIG. 2), one or more action datasets based on the updated ranking of the set of relevant action datasets, the relevance component may also classify, categorize, or otherwise segregate each of the relevant action datasets of the ranked set of relevant action datasets.

As is described herein, the command representation can include any number of terms, keywords, or phrases, any of which can be determined by the server device as corresponding to a keyword, phrase, or parameter field of one or more command templates stored and searchable by the server device. Further, a command template can include any number of terms, keywords, or parameter fields (of any parameter type), where each parameter field of a specific parameter type can be associated with a plurality of defined or known parameters. In this way, any number of terms, keywords, or phrases of a command representation can be matched to terms, keywords, or phrases of one or more command templates, and also to one or more of the plurality of defined or known parameters determined to be associated with the one or more command templates based on the defined parameter types and the defined or known parameters associated therewith.

The search engine described herein may include searching component 345. The search engine (e.g., searching component 345) can employ any search technology generally known by one of ordinary skill in the art. However, it is the specific processes, data types, and modification of results described herein that distinguish the present disclosure from conventional systems. The search result(s) generated by the search engine are provided to the server device, so that priorities of potential action datasets included in the search result can be boosted and/or rearranged based on a defined set of rules that each relate to a relevance determination of each potential action dataset to the received command representation. In some embodiments, the search engine can generate and define a score for association with each potential action dataset included in the search result. The score can be generated based on a variety of factors, such as matching accuracy, among other things. In some further embodiments, a relevance component (e.g., relevance component 350 of FIG. 3A and/or relevance component 380 of FIG. 3B) can define and redefine the priorities of action datasets included in the search result, as will be described. As noted elsewhere, the search engine can return a ranked set of relevant action datasets. The ranking may be based on a primary and/or initial score generated by the search engine. The relevance component may update the ranking of the set of relevant action datasets based on a secondary score. In at least one embodiment, the relevance component may update the ranking based on up-boosting the initial score of some of the relevant action datasets, while downboosting the initial scores of other relevant action datasets, based on slotting parameters into the relevant action datasets and generating features for the action datasets based on the slotted parameters.

In some embodiments, at step 510, the server device can determine whether the command representation (e.g., "find hotels in san jose using hotels.com"), received from a digital assistant device, includes a strong mention or a weak mention to one of a plurality of known applications or application names The server device can either employ the entire command representation as a query, or parse the received command representation into one or more portions that are each employed as an independent query. A query can be employed to search a database of known application names, so that a determination can be made on whether the received command representation includes a reference to any application name in the database of known application names As described herein, the database can be maintained by the server device, or can be searchable by the server device (e.g., an application marketplace).

In some embodiments, specific terms or characteristics (e.g., prepositions) thereof included in the command representation can be detected and employed, by the server device, to determine a likely reference to an application name, or in other words, that a strong mention of the application name follows the preposition or is otherwise included in the command representation. In this regard, and by way of example, "show messages in WhatsApp" can indicate a strong preposition (e.g., "in") to invoke the WhatsApp application. In another example "book a hotel using Hotels.com" can indicate a strong preposition (e.g., "using") to invoke the Hotels.com application. In various embodiments, application names may have any number of alternative names or synonyms that can be determined, by the server device, as corresponding to a particular application. For instance, a reference to "Google Drive" or "Drive" could correspond to the Google Drive application, or a reference to "Amazon" could correspond to the "Amazon Shopping" application, or vice versa, by way of example. It is contemplated that any variation of application names can be detected by the server device, and matched to a corresponding application name via the search engine. If a strong or direct reference to an application name is determined to be included in the received command representation, the server device can, at step 520*a*, generate a score (e.g., 0.1), which is maintained in a memory, and move forward with processing the command representation. In some further embodiments, the server device can extract or remove the detected prepositions and application name from the command representation. In this regard, a reduced command representation can include the remaining keywords or phrases without the determined strong mention of the detected application name (e.g., "show messages" or "book a hotel").

In some embodiments, the server device can determine that the command representation includes a reference to an application name, but that the application name is not assertively recited with a strong preposition (e.g., use, using, in, through). In this regard, the server device can determine that the command representation includes a weak mention of the application name In this regard, and by way of example, "show WhatsApp messages" can indicate a weak mention of the WhatsApp application. In another example "book a Hotels.com hotel" can indicate a weak mention of the Hotels.com application. If a weak mention or a weak reference to an application name is determined to be included in the received command representation, the server device can, at step 520*b*, generate a second score (e.g., 0.001), which is maintained in a memory. In some further embodiments, the server device can extract or remove the detected application name from the command representation. In this regard, the reduced command representation can include the remaining keywords or phrases without the weak mention of the detected application name (e.g., "show messages" or "book a hotel").

In some embodiments, the server device can determine, at 520*c*, that the command representation does not include a reference to an application name In this regard, and by way of example, "show messages" can indicate no mention of an application. In another example "book reservation" can also indicate a no mention of an application. If no application name is determined to be included in the received command representation, the server device can move forward with processing the command representation.

In some embodiments, the server device can, at step 530, identify one or more command templates stored by the server device that it determines corresponds to the reduced command representation or a command representation including no reference to an application name More specifically, the server device can generate a first query for communication to the search engine, such as but not limited to searching component 345 of FIG. 3A, employing either a reduced command representation or a command representation including no reference to an application name, to determine whether any of the stored command templates corresponds thereto. Based on the received search results, the server device can make a determination that at least one command template corresponds to the reduced command representation or command representation including no reference to an application name In this regard, the server device can make a determination that the received command representation is suitable for conducting an additional search on the command templates stored by the server device. The server device can then select the determined corresponding command template(s), and generate, at step 540, one or more new search queries to send to the search engine, each new search query including at least one of the selected command templates and the received (e.g., non-reduced) command representation. If, however, a determination is made that no search results (e.g., action datasets or command templates associated therewith) corresponds to the reduced command representation, the server can make a determination that the received command representation is either too generic or not suitable for use for selecting a corresponding action dataset. In this regard, the server device can communicate to the digital assistant device that the received command representation is too vague, or inadequate to receive an action dataset in response to the received command or command representation.

In some embodiments, the server device can send the newly generated search query, including the received (e.g., non-reduced) command representation and the command templates determined to correspond to the reduced command representation, to the search engine (e.g., searching component 345) to search the stored plurality of command templates, each stored command template being associated with at least one action dataset stored by the server device. The search engine can then generate, at step 550, one or more search results based on the newly generated search query. Each search result can include or reference an action dataset having one or more command templates that is determined, by the search engine, to correspond at least in part to the newly generated search query. In some further embodiments, the search engine can generate a preliminary (or initial) score that is associated with or appended to each action dataset included in the search result. The preliminary score can be generated by the search engine based on a variety of factors, including confidence levels, level of accuracy, percentage of matching keywords or phrases, ordering of matching keywords or phrases, number of other corresponding action datasets, and the like. It is contemplated that the preliminary score can consider any number of factors generally known to one of ordinary skill in the art in determining a confidence score for search results generated by a search engine. The search results may include a set of relevant (or candidate) action datasets that are ranked via the preliminary score.

In some embodiments, the server device can evaluate each search result (e.g., relevant action datasets and/or associated command template(s)) against a set of defined rules to generate, at step 560, a score for association with the search result. For instance, the server device may employ relevance component 350 of FIG. 3A and/or relevance component 380 of FIG. 3B, to evaluate a search result (e.g., each relevant action dataset of the ranked set of relevant action datasets) against each rule in the set of defined rules (e.g., deep knowledge). As is described herein with respect to relevance component 350 of FIG. 3A and/or relevance component 380 of FIG. 3B, the set of defined rules can be employed to determine whether the received command representation: contains a determined strong mention of an application or application name of a plurality of known applications or application names, matches or corresponds to a dictionary-based template, contains a determined weak mention of an application or application name of a plurality of known applications or application names, matches or corresponds to a plurality of command templates, does not exactly match or directly correspond to a command template but contains keywords or phrases that can be determined to match or correspond to parameters of a corresponding parameter database, contains keywords or phrases that cannot be determined to match or correspond to parameters of a corresponding parameter database, or determined to match or correspond to a wildcard command template, among other things, each described herein with respect to the defined rules of relevance component 350 of FIG. 3A.

As described herein, each application dataset stored by the server device can include or be associated with various types of data, such as an application or application name, and one or more command templates with keywords, phrases, or parameter types, among other things. The server device can employ the relevance component to evaluate each search result (e.g., application dataset) returned from the search engine, and generate a score based on each rule in the defined set of rules that is determined to be satisfied for the search result (e.g., application dataset). As is described with respect to relevance component 350 of FIG. 3A, a rule can be determined satisfied based on comparisons of conditions defined by the rule, against any combination of any portion of the application dataset, the data included or associated with the application dataset, and/or any portion of the received command representation. At step 570, after a search result application dataset is evaluated for relevance, the application dataset or a score associated with the action dataset can be modified by the server device. In other words, for each action dataset, each score generated based on a rule can be associated with the action dataset in a variety of manners. For instance, each score can be added to other scores generated for the action dataset to calculate a sum of scores appended to or associated with the action dataset. In another instance, each score can be assigned independent of one another, and appended to or associated with the action dataset.

In some embodiments, after each search result (e.g., action dataset) is evaluated against the defined set of rules and is, in some instances, modified based on whether any number of rules is determined satisfied, the search results (e.g., action datasets) can be re-ranked by the server device based on their modified scores. The server device can sort each search result based on their modified scores, and select one or more of the corresponding action datasets based on a defined threshold. A defined threshold can be defined to select only a highest-ranked action dataset, a predefined plurality of highest-ranked action datasets (e.g., the top 5 ranked), or a predefined percentage of highest-ranked action datasets (e.g., the top 5% ranked). In some further embodiments, the server device can determine that two or more search results are associated with the same rank or score. In this regard, the server can perform an additional search to determine which application dataset is more popular than the other application dataset. For instance, an application marketplace database can be searched to determine which application associated with the two or more search results has a higher download rate. In this way, the server can identify a more-likely candidate of the two or more action datasets determined to have the same rank or score.

In some embodiments, at step 580, the server device can select one or more of the determined highest ranked search results (e.g., action datasets) based on the defined threshold. At this juncture, the server device has employed its relevance determinations to identify the most probable action dataset to correspond to the command representation received from the digital assistant device. The server device can then communicate the selected one or more action datasets to the digital assistant device from which the command representation was received, as its response to the received command representation. In some aspects, if more than one action dataset is communicated to the digital assistant device, the digital assistant device can provide for display a prompt that requests a selection of the action dataset desired for invocation by the digital assistant device. The digital assistant device can then receive the selection and invoke the corresponding action dataset. In some instances, the digital assistant device can communicate the selection to the server device, and the server device can responsively communicate the corresponding action dataset to the digital assistant device for invocation thereon. In some other instances, the digital assistant device can receive each relevant action dataset, and invoke the action dataset based on the received selection.

Figure 6:
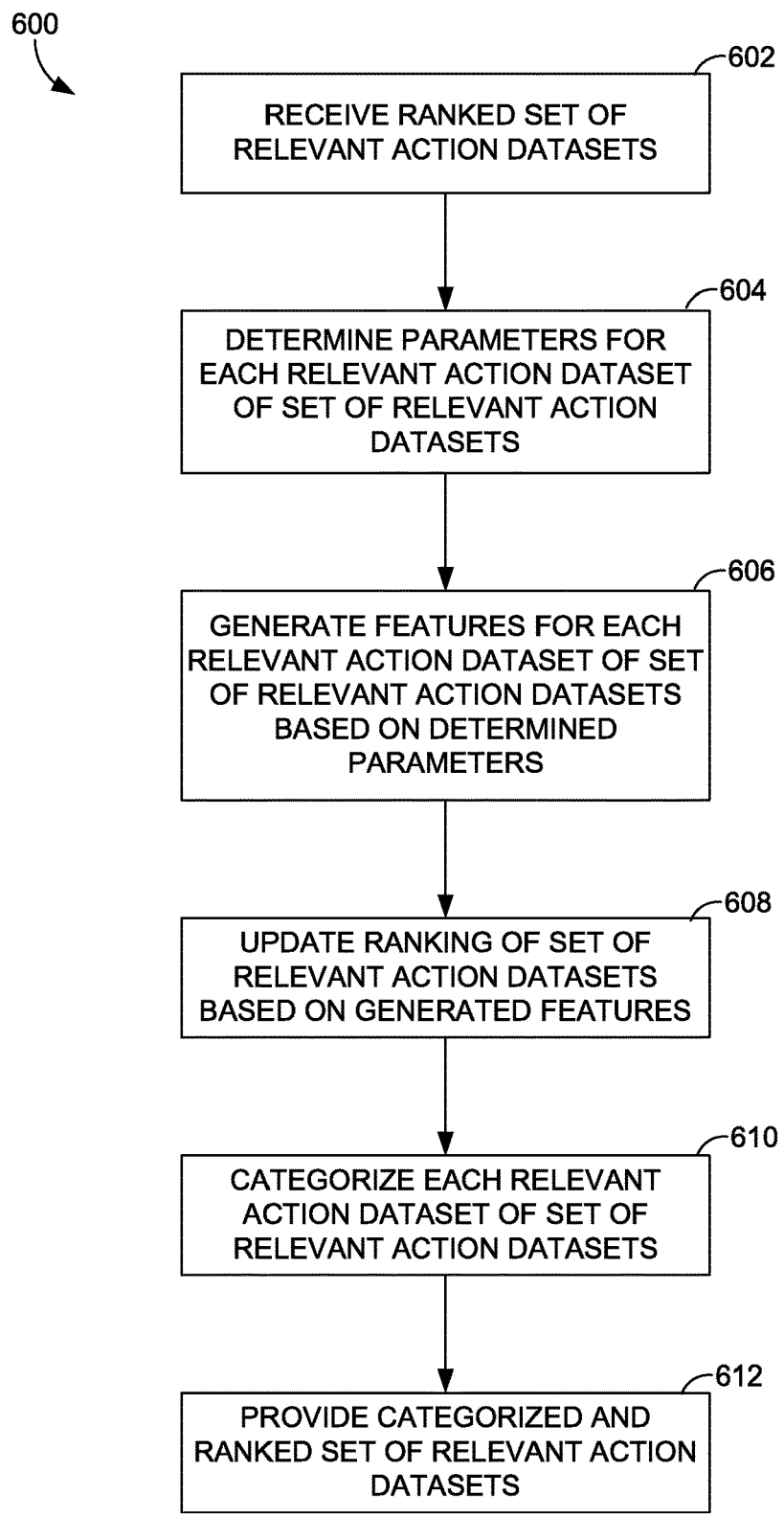
FIG. 6 is a flow diagram showing another method for determining, selecting, and communicating most-relevant actionable operations for distribution in a crowd-sourced digital assistant network, according to various embodiments of the present invention.

Turning now to FIG. 6, an embodiment of a process flow or method 600 for effectively determining and selecting most-relevant actionable operations (i.e., relevant action datasets), based on parameters that are determined, identified, and/or matched to the relevant action datasets. Similar to process 500 of FIG. 5, a server device, such as digital assistant server 310 of FIG. 3A, can receive a command or a command representation transmitted from a digital assistant device, such as digital assistant device 210 of FIG. 2. The command or command representation can include, among other things, an alphanumeric text representation of a spoken command that was obtained by the digital assistant device. In some embodiments, at least a portion of the received command may include information that indicates one or more parameters and/or parameter types. As discussed throughout, one or more parameters and/or parameter types may be inferred, determined, and/or identified based on the received command, one or more rules and/or heuristics, Process 600 may rank a set of relevant action datasets based on the determined parameters for the relevant action datasets.

To this end, the digital assistant device can either receive the alphanumeric text representation from another computing device, or employ a speech-to-text engine or $3^{rd}$-party service to convert the detected spoken command to alphanumeric text before it is communicated to the server device. After the command representation is received, the server device can employ a search engine, such as searching component 345, to search any number of databases, known or defined parameters, command templates, action datasets, dictionaries, or any other type of data or feature described in the present disclosure, at any time. The search engine can employ any one or more portions of a command representation, an action dataset, a command template, and the like, as queries to search any of the foregoing types of data or features. The search engine can generate a search result that includes any associated or at least partially associated types of data, which can also correspond to any of the foregoing types of data or features.

At block 602, a ranked set of relevant action datasets are received. The received set may be a set of candidate relevant action datasets. For example, a relevance component, such as but not limited to relevance component 350 of FIG. 3A and/or relevance component 380 of FIG. 3B may receive a ranked set of candidate relevant action datasets from a search component, such as but not limited to searching component 345 of FIG. 3A. Each candidate relevant action dataset of the set of candidate action datasets may correspond to at least a portion of a command that is received from a client device, such as but not limited to digital assistant device 210 of FIG. 2. In some embodiments, each candidate relevant action dataset may be an embodiment of action dataset 410 of FIG. 4. As such, each candidate relevant action dataset may include or at least be associated with a command template, such as but not limited command templates 440 of FIG. 4. Each command template may include a set of parameter fields for the associated candidate relevant action dataset. The ranking may be based on a preliminary and/or secondary score for the candidate relevant action datasets.

At block 604, one or more parameters are determined for each candidate relevant action dataset of the set of candidate relevant action datasets. In some embodiments, parameter slotter 382 of FIG. 3B, may slot, match, and/or select the parameters based on the received command. Parameter slotter 382 may determine parameter values for each parameter field of the set of parameter fields for the command template associated with each action dataset of the set of action datasets.

At block 606, features may be generated for each candidate relevant action dataset of the set of candidate relevant action datasets based on the determined parameters. The features may be candidate relevant action features of the candidate relevant action datasets. Feature generator 384 may generate the features based on the command and/or the one or more determined parameters values for each parameter field of set of parameter fields for the command template associated with each action dataset of the set of action datasets.

At block 608, the ranking if the set of candidate relevant action datasets may be updated based on the features generated at block 606. In some embodiments, action ranker 386 may update the ranking of the set of candidate relevant action datasets. A secondary score may be generated for each of the candidate relevant action datasets based on the action features. A final score may be generated based on a combination of the preliminary score and the secondary score for each candidate relevant action datasets. The updated ranking may be based on the final and/or secondary scores.

At block 610, the set of candidate relevant action datasets may be segmented. For example, action segmenter 388 of FIG. 3B may segment the set by classifying, labeling, and/or classifying each of the candidate relevant action datasets based on the generated features and/or the command. In some embodiments, the classification and/or categorizations of the candidate relevant action datasets may include one or more of the following classifications and/or categories: main, related, recommended, promoted, incomplete, complete, informational, and/or federation. At block 610, at least a portion of the categorized and ranked set of candidate relevant action datasets may be provided. For example, at least some of candidate relevant action datasets may be provided to a client device (e.g., digital assistant device 210 of FIG. 2) based on the category, ranking, and/or final score of the candidate relevant action dataset. In some embodiments, at least one action dataset categorized as the main action dataset is provided to the client device for execution, via the determined parameters. In at least one embodiments, the provided action datasets include the parameter values slotted, matched, and/or selected for each of the parameter fields for the corresponding command template.

Having described various embodiments of the invention, an exemplary computing environment suitable for implementing embodiments of the invention is now described.

Figure 7:
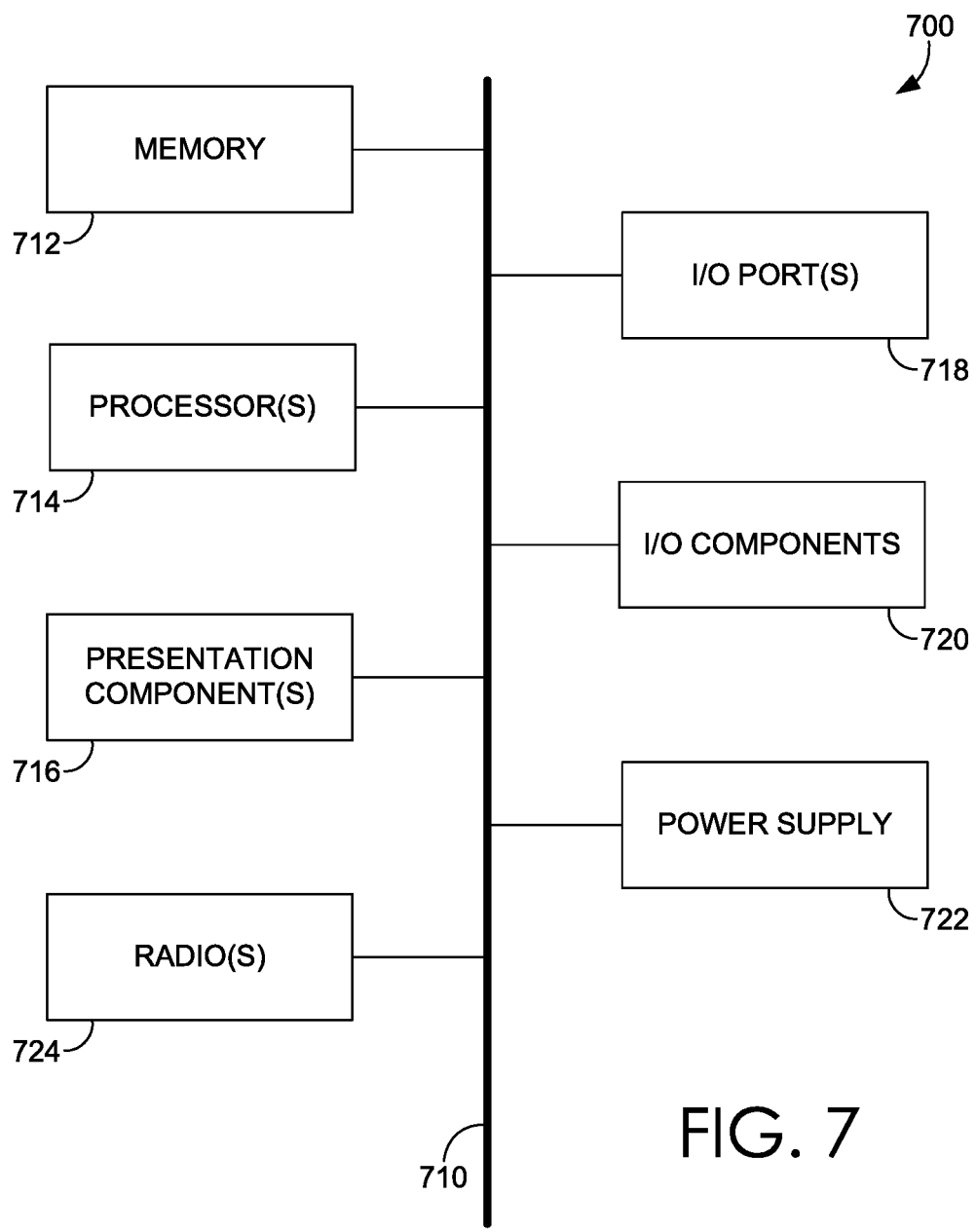
FIG. 7 is a block diagram of an exemplary computing environment suitable for use in implementing embodiments of the present invention.

With reference to FIG. 7, an exemplary computing device is provided and referred to generally as computing device 700. The computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method for providing relevant digital assistant operations to a digital assistant device based on a command received from the digital assistant device, the method comprising:

receiving, at a server device, a set of action datasets, wherein each action dataset of the set of action datasets corresponds to at least a portion of the command and is associated with a command template that includes a set of parameter fields for the associated action dataset;

determining one or more parameter values, based on the command, for each parameter field of the set of parameter fields for the command template associated with each action dataset of the set of action datasets;

generating one or more action features for each action dataset of the set of action datasets based on the command and the one or more determined parameters values for each parameter field of set of parameter fields for the command template associated with each action dataset of the set of action datasets, wherein at least one of the one or more generated action features indicates whether an application corresponding to the action dataset is installed on the digital assistant device;

determining a ranking of the set of action datasets based on the one or more generated action features for each action dataset of the set of action datasets;

determining a classification for each action dataset of the set of action datasets based on the one or more generated action features for each action dataset of the set of action datasets; and providing, to the digital assistant device, one or more action datasets of the set of action datasets based on at least one of the ranking of the set of action datasets or the classification for each action dataset of the set of action datasets, wherein each action dataset of the provided one or more action datasets includes the determined one or more parameter values for the command template associated with the provided action dataset.

2. The computer-implemented method of claim 1, wherein each of action dataset of the set of action datasets is relevant to the command and is a candidate action dataset that matches the command.

3. The computer-implemented method of claim 1, further comprising:
   determining one or more keywords included in the received command;
   slotting the one or more determined keywords into at least a portion of the set of parameter fields for the command templates associated with at least one action dataset, based on one or more rules; and
   determining the one or more parameter values for each parameter field of the set of parameter fields for the command template based on a likelihood score associated with the slotted one or more keywords.

4. The computer-implemented method of claim 1, wherein at least one of the one or more generated action features indicates whether a parameter value has been determined for each parameter field of the set of parameter fields for the command template.

5. The computer-implemented method of claim 1, wherein each action dataset of the received set of action datasets includes a preliminary score and the method further comprises:
   determining a secondary score for each action dataset of the set of action datasets based on the one or more action features generated for the action dataset;
   determining a final score for each action dataset of the set of action datasets based on a combination of the preliminary score and the secondary score for the action dataset; and
   determining the ranking of the set of action datasets based on the final score for each action dataset of the set of action datasets.

6. The computer-implemented method of claim 1, further comprising:
   identifying the one or more action datasets to provide to the digital assistant based on each of the identified one or more action datasets having a parameter value determined for each parameter field of the set of parameter fields of the associated command template.

7. A non-transitory computer storage medium storing computer-useable instructions that, when used by one or more processors, cause the one or more processors to perform operations or providing relevant digital assistant operations to a digital assistant device based on a command received from the digital assistant device, the operations comprising:
   receiving, at a server device, a set of action datasets, wherein each action dataset of the set of action datasets corresponds to at least a portion of the command and is associated with a command template that includes a set of parameter fields for the associated action dataset;
   determining one or more parameter values, based on the command, for each parameter field of the set of parameter fields for the command template associated with each action dataset of the set of action datasets;
   generating one or more action features for each action dataset of the set of action datasets based on the command and the one or more determined parameters values for each parameter field of set of parameter fields for the command template associated with each action dataset of the set of action datasets, wherein at least one of the one or more generated action features indicates whether an application corresponding to the action dataset is installed on the digital assistant device;
   determining a ranking of the set of action datasets based on the one or more generated action features for each action dataset of the set of action datasets;
   determining a classification for each action dataset of the set of action datasets based on the one or more generated action features for each action dataset of the set of action datasets; and
   providing, to the digital assistant device, one or more action datasets of the set of action datasets based on at least one of the ranking of the set of action datasets or the classification for each action dataset of the set of action datasets, wherein each action dataset of the provided one or more action datasets includes the determined one or more parameter values for the command template associated with the provided action dataset.

8. The non-transitory computer storage medium of claim 7, wherein each of action dataset of the set of action datasets is relevant to the command and is a candidate action dataset that matches the command.

9. The non-transitory computer storage medium of claim 7, wherein the actions further comprise:
   determining one or more keywords included in the received command;
   slotting the one or more determined keywords into at least a portion of the set of parameter fields for the command templates associated with at least one action dataset, based on one or more rules; and
   determining the one or more parameter values for each parameter field of the set of parameter fields for the command template based on a likelihood score associated with the slotted one or more keywords.

10. The non-transitory computer storage medium of claim 7, wherein at least one of the one or more generated action features indicates whether a parameter value has been determined for each parameter field of the set of parameter fields for the command template.

11. The non-transitory computer storage medium of claim 7, wherein each action dataset of the received set of action datasets includes a preliminary score and the operations further comprise:
    determining a secondary score for each action dataset of the set of action datasets based on the one or more action features generated for the action dataset;
    determining a final score for each action dataset of the set of action datasets based on a combination of the preliminary score and the secondary score for the action dataset; and
    determining the ranking of the set of action datasets based on the final score for each action dataset of the set of action datasets.

12. The non-transitory computer storage medium of claim 7, wherein the operations further comprise:
    identifying the one or more action datasets to provide to the digital assistant based on each of the identified one or more action datasets having a parameter value determined for each parameter field of the set of parameter fields of the associated command template.

13. A system or providing relevant digital assistant operations to a digital assistant device based on a command received from the digital assistant device, comprising:
    a processor device; and
    a computer-readable storage medium, coupled with the processor device, having instructions stored thereon, which, when executed by the processor device, perform actions comprising:

receiving, at a server device, a set of action datasets, wherein each action dataset of the set of action datasets corresponds to at least a portion of the command and is associated with a command template that includes a set of parameter fields for the associated action dataset;

determining one or more parameter values, based on the command, for each parameter field of the set of parameter fields for the command template associated with each action dataset of the set of action datasets;

generating one or more action features for each action dataset of the set of action datasets based on the command and the one or more determined parameters values for each parameter field of set of parameter fields for the command template associated with each action dataset of the set of action datasets, wherein at least one of the one or more generated action features indicates whether an application corresponding to the action dataset is installed on the digital assistant device;

determining a ranking of the set of action datasets based on the one or more generated action features for each action dataset of the set of action datasets;

determining a classification for each action dataset of the set of action datasets based on the one or more generated action features for each action dataset of the set of action datasets; and providing, to the digital assistant device, one or more action datasets of the set of action datasets based on at least one of the ranking of the set of action datasets or the classification for each action dataset of the set of action datasets, wherein each action dataset of the provided one or more action datasets includes the determined one or more parameter values for the command template associated with the provided action dataset.

14. The system of claim 13, wherein each of action dataset of the set of action datasets is relevant to the command and is a candidate action dataset that matches the command.

15. The system of claim 13, the actions further comprising:
  determining one or more keywords included in the received command;
  slotting the one or more determined keywords into at least a portion of the set of parameter fields for the command templates associated with at least one action dataset, based on one or more rules; and
  determining the one or more parameter values for each parameter field of the set of parameter fields for the command template based on a likelihood score associated with the slotted one or more keywords.

16. The system of claim 13, wherein at least one of the one or more generated action features indicates whether a parameter value has been determined for each parameter field of the set of parameter fields for the command template.

17. The system of claim 13, wherein each action dataset of the received set of action datasets includes a preliminary score and the action further comprises:
  determining a secondary score for each action dataset of the set of action datasets based on the one or more action features generated for the action dataset;
  determining a final score for each action dataset of the set of action datasets based on a combination of the preliminary score and the secondary score for the action dataset; and
  determining the ranking of the set of action datasets based on the final score for each action dataset of the set of action datasets.

* * * * *